(12) United States Patent
Swiniarski et al.

(10) Patent No.: US 11,780,401 B1
(45) Date of Patent: Oct. 10, 2023

(54) VEHICLE OCCUPANT PROTECTION SYSTEMS HAVING FRICTIONALLY ENGAGING TETHER

(71) Applicant: Zoox, Inc., Foster City, CA (US)

(72) Inventors: Michal Jan Swiniarski, Brentwood (GB); Mark Alan Bates, Kenilworth (GB); Markus Jost, San Mateo, CA (US); David Maurice Libeaut, Bidford-on-Avon (GB)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/956,386

(22) Filed: Sep. 29, 2022

(51) Int. Cl.
  *B60R 21/2338* (2011.01)
  *B60R 21/214* (2011.01)
  *B60R 21/232* (2011.01)
  *B60R 21/231* (2011.01)

(52) U.S. Cl.
  CPC ........ *B60R 21/2338* (2013.01); *B60R 21/214* (2013.01); *B60R 21/232* (2013.01); *B60R 2021/23161* (2013.01); *B60R 2021/23386* (2013.01)

(58) Field of Classification Search
  CPC . B60R 21/2338; B60R 21/214; B60R 21/232; B60R 2021/23161; B60R 2021/23386
  See application file for complete search history.

(56) References Cited

U.S. PATENT DOCUMENTS

| 3,774,936 A | 11/1973 | Barnett |
| 5,470,103 A | 11/1995 | Vaillancourt et al. |
| 6,382,660 B1 | 5/2002 | Starner et al. |
| 6,863,299 B2 | 3/2005 | Schneider et al. |
| 6,913,280 B2 | 7/2005 | Dominissini et al. |
| 6,932,380 B2 | 8/2005 | Choi |

(Continued)

FOREIGN PATENT DOCUMENTS

| DE | 4212416 A1 | 11/1992 |
| DE | 10007343 A1 | 8/2001 |

(Continued)

OTHER PUBLICATIONS

"Passenger Airbag; Bag in Roof (BIR)", Bustos et al., Cognitive Safety Systems; TRW Automotive, Apr. 1, 2014; 19 pages.

(Continued)

*Primary Examiner* — Drew J Brown
(74) *Attorney, Agent, or Firm* — EIP US LLP

(57) ABSTRACT

An occupant protection system may comprise an expandable curtain, expandable bladder and tether. The curtain may be configured to expand from a stowed state to a deployed state. In the deployed state, the curtain may comprise a transverse portion having a support side face and a rear side face. The bladder may be configured to expand from a stowed state to a deployed, wherein in the deployed state, the bladder comprises an occupant facing surface and a rear surface configured to face the support side face of the curtain. The tether may be attached at a first location to the bladder and at a second location such that in the deployed state of the curtain and bladder, the tether extends behind the rear side face of the curtain and frictionally engages the rear side face of the curtain, thereby creating a resistance to lateral movement of the bladder.

20 Claims, 10 Drawing Sheets

(56) References Cited

U.S. PATENT DOCUMENTS

| | | | |
|---|---|---|---|
| 7,195,276 B2 | 3/2007 | Higuchi | |
| 7,222,877 B2 | 5/2007 | Wipasuramonton et al. | |
| 7,726,684 B2 | 6/2010 | Breed et al. | |
| 8,403,358 B2 | 3/2013 | Choi et al. | |
| 8,807,593 B2 | 8/2014 | Lee et al. | |
| 9,004,526 B2 | 4/2015 | Fukawatase et al. | |
| 9,446,735 B1 | 9/2016 | Jayasuriya et al. | |
| 9,493,135 B2 | 11/2016 | Fukawatase | |
| 9,725,064 B1 | 8/2017 | Faruque et al. | |
| 9,802,568 B1 | 10/2017 | Larner | |
| 9,969,346 B2 | 5/2018 | Patel et al. | |
| 9,994,182 B1 | 6/2018 | Jaradi et al. | |
| 10,279,770 B2 | 5/2019 | Faruque et al. | |
| 10,471,923 B2 | 11/2019 | Jimenez et al. | |
| 10,703,323 B2 * | 7/2020 | Jost | B60R 21/01512 |
| 10,960,844 B2 | 3/2021 | Jimenez et al. | |
| 11,383,669 B2 * | 7/2022 | Schneider | B60R 21/2338 |
| 11,577,682 B1 * | 2/2023 | Bates | B60R 21/214 |
| 2002/0175502 A1 * | 11/2002 | Tesch | B60R 21/232 |
| | | | 280/730.2 |
| 2006/0097492 A1 | 5/2006 | Bakhsh et al. | |
| 2006/0226640 A1 | 10/2006 | Prakah-Asante et al. | |
| 2010/0140909 A1 | 6/2010 | Jang | |
| 2010/0225096 A1 | 9/2010 | Bustos Garcia et al. | |
| 2013/0197764 A1 | 8/2013 | Thomas | |
| 2014/0097601 A1 | 4/2014 | Fukawatase et al. | |
| 2014/0375033 A1 | 12/2014 | Fukawatase | |
| 2016/0031401 A1 | 2/2016 | Jaradi et al. | |
| 2016/0311393 A1 | 10/2016 | Smith et al. | |
| 2017/0225641 A1 | 8/2017 | Faruque et al. | |
| 2017/0267204 A1 | 9/2017 | Farooq et al. | |
| 2018/0215338 A1 | 8/2018 | Faruque et al. | |
| 2018/0222432 A1 | 8/2018 | Schneider | |
| 2019/0016291 A1 | 1/2019 | Paxton et al. | |
| 2019/0193666 A1 | 6/2019 | Jost et al. | |
| 2020/0307496 A1 * | 10/2020 | Jimenez | B60R 21/2338 |
| 2020/0406852 A1 * | 12/2020 | Fischer | B60R 21/2338 |

FOREIGN PATENT DOCUMENTS

| | | |
|---|---|---|
| GB | 2385303 A | 8/2003 |
| WO | 2005000638 A1 | 1/2005 |
| WO | 2012122997 A1 | 9/2012 |

OTHER PUBLICATIONS

"Passenger Airbag: Bag in Roof Technology", TRW Occupant Safety Systems (Jan. 1, 2013); 2 pages.

* cited by examiner

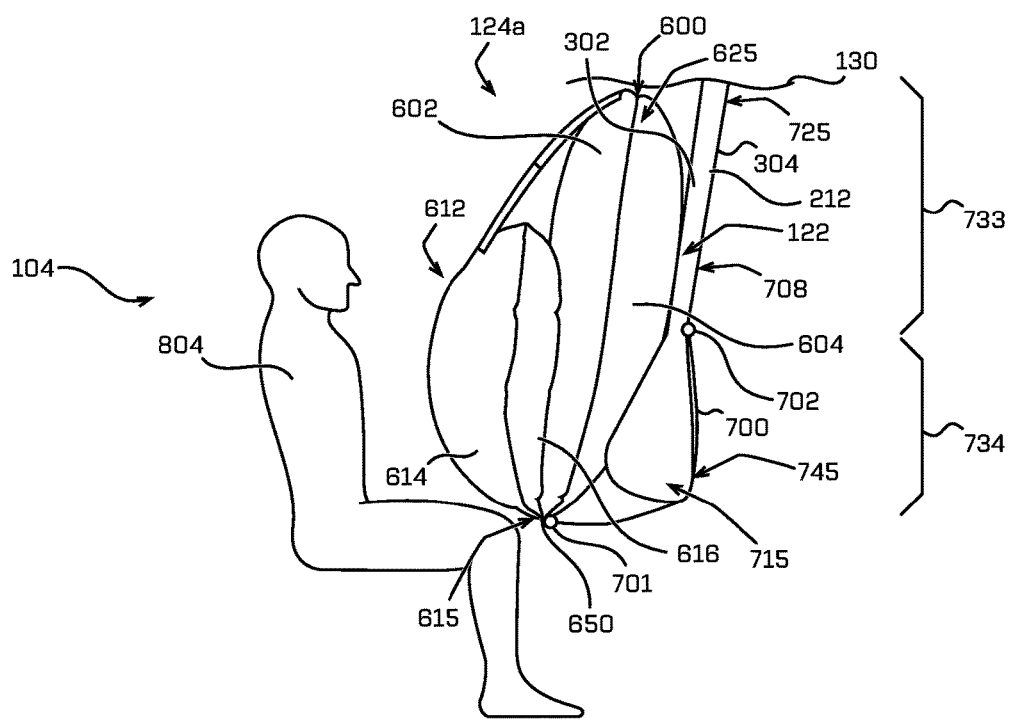
FIG. 7A
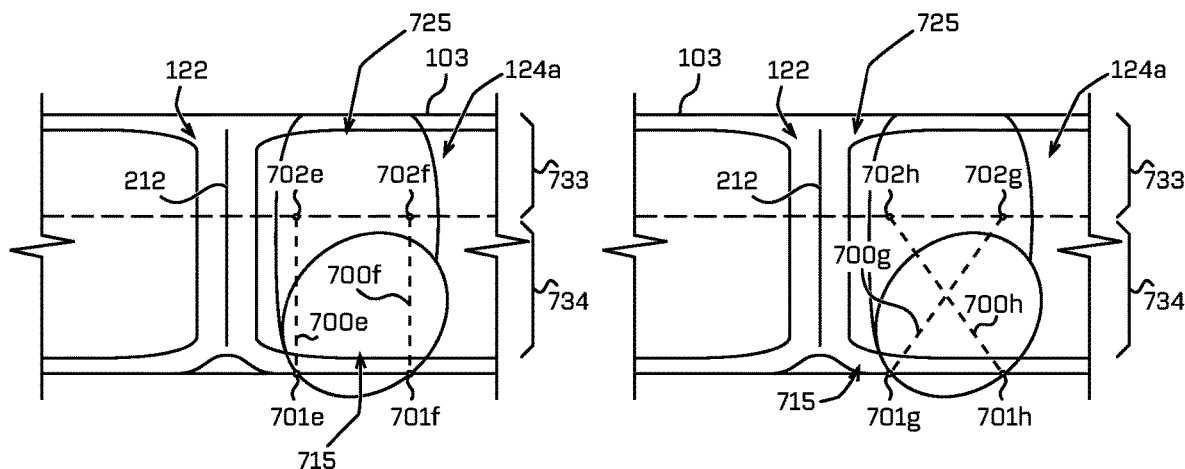
FIG. 7B
FIG. 7C

VEHICLE OCCUPANT PROTECTION SYSTEMS HAVING FRICTIONALLY ENGAGING TETHER

BACKGROUND

Airbags protect occupants of a vehicle from injury during a collision involving the vehicle. An airbag system may include an airbag and an inflator for providing the airbag with a gas to inflate the airbag. Upon involvement in a collision, airbags may rapidly inflate to create a cushion between the occupant and interior surfaces of the vehicle.

BRIEF DESCRIPTION OF DRAWINGS

The detailed description is described with reference to the accompanying figures. The use of the same reference numbers in different figures indicates similar or identical components or features.

FIG. 7A is a schematic diagram showing an example expandable bladder and expandable curtain with a vehicle occupant before the occupant contacts the expandable bladder, and with an example tether extending behind the expandable curtain and attached at a first location to the expandable bladder and attached at a second location to the expandable curtain.

FIG. 7B is a partial front view of an example expandable bladder and expandable curtain with example tethers extending generally parallel behind the expandable curtain and attached at first locations to the expandable bladder and attached at second locations to a vehicle roof.

FIG. 7C is a partial front view of an example expandable bladder and expandable curtain with example tethers crossing each other behind the expandable curtain, with the tethers attached at first locations to the expandable bladder and at second locations to a vehicle roof.

DETAILED DESCRIPTION

Figure 1:
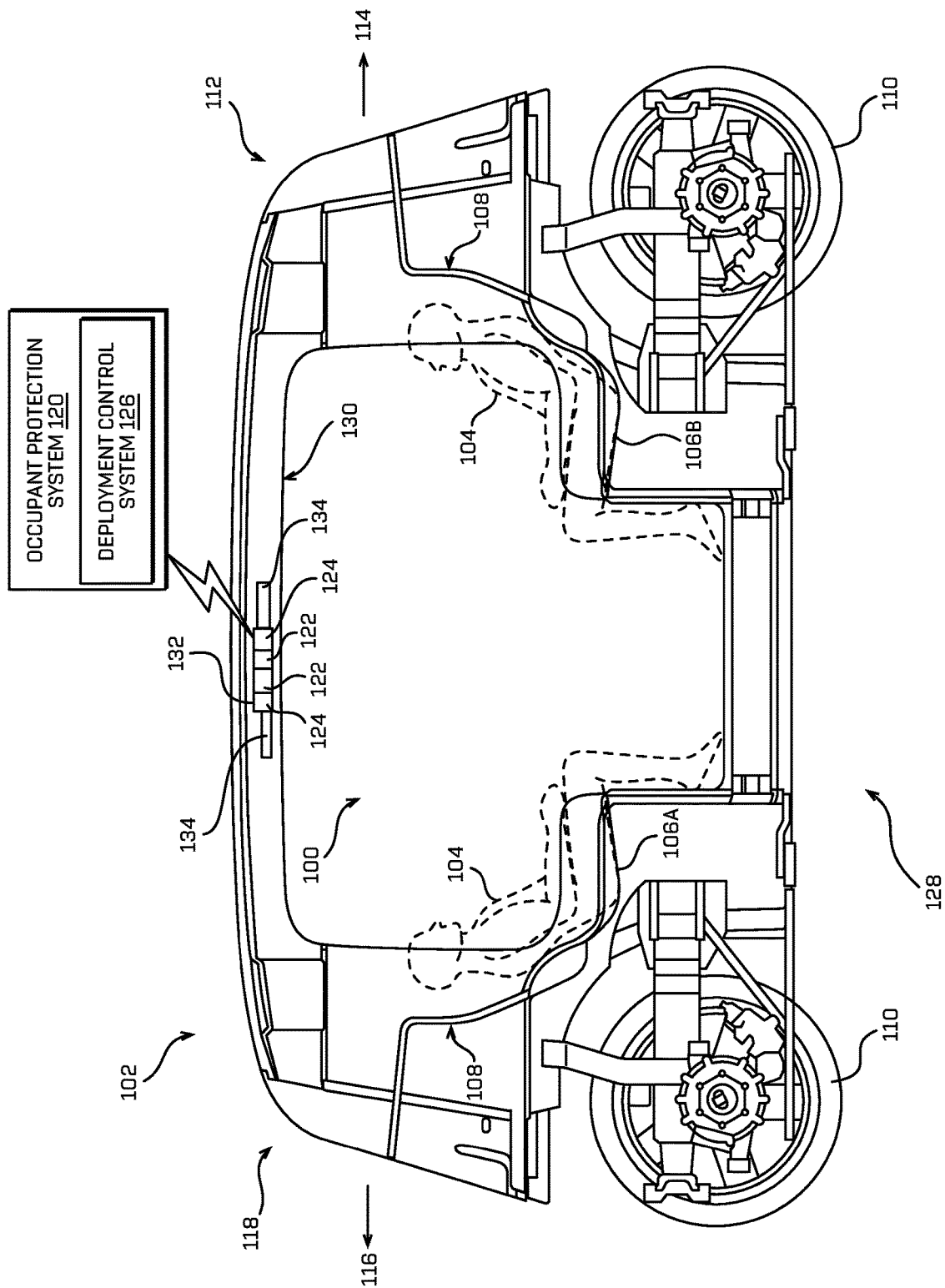
FIG. 1 is a cutaway side view of an example vehicle including an example occupant protection system.

Airbags or occupant protection systems may be used to protect occupants of a vehicle from injury during a collision involving the vehicle. An airbag system may include an airbag and an inflator for providing the airbag with a gas to inflate the airbag. Upon involvement in a collision, the airbag may be inflated rapidly to create a cushion between the occupant and interior surfaces of the vehicle. Certain vehicle designs, however, may result in difficulty in protecting an occupant with an airbag system or present other problems. In a vehicle with carriage style seating, no steering wheel, and/or no instrument panel, for example, airbags may be deployed from a roof area near a center of the interior of the vehicle. In such vehicle designs, occupant protection systems may have multiple expanding elements such as one or more expandable curtains and one or more expandable bladders that provide cushioning between the occupant and interior structures of the vehicle so that the occupant will be prevented from being thrown into the interior structures and/or, in some instances, being ejected from the vehicle.

The expandable curtain(s) may protect an occupant by, for example, providing support for the expandable bladder(s) and/or providing a cushion for the occupant moving sideways or laterally during a collision. The expandable bladder(s) may protect an occupant by, for example, providing a cushion for an occupant moving forwards during a collision (e.g., during a frontal collision). However, having expandable bladder(s) and curtain(s) can result in the expandable bladder(s) and/or curtain(s) expanding from a stowed state to a deployed state too slowly to protect an occupant and/or result in the curtains or bladders being stowed in formation that is not advantageous for deployment. The expandable bladder(s) in such designs may also be too unstable during deployment (e.g., one ore more of the bladders may move in a generally lateral or side-to-side direction during deployment), which can result in the bladder(s) failing to adequately protect occupant(s) during a collision (e.g., during a frontal collision). Examples herein are generally directed to vehicles, occupant protection systems and methods of utilizing occupant protections systems that address or mitigate one or more of the above-noted drawbacks or address other problems with existing airbags or occupant protection systems.

In examples, a vehicle may comprise an occupant protection system. The occupant protection system may comprise an expandable curtain, an expandable bladder, and a tether. The expandable bladder may be configured to expand from a stowed state to a deployed state. The deployed state may have a length configured to extend at least a portion of a distance between a roof of the vehicle and a floor of the vehicle. In the deployed state, the expandable curtain may comprise a transverse portion having a support side face and a rear side face, which may be opposite the support side face. The expandable bladder may likewise be configured to expand from a stowed state to a deployed state having a length configured to extend at least a portion of a distance between the vehicle roof and the vehicle floor. In the deployed state of the expandable bladder, the expandable bladder may comprise an occupant facing surface and a rear surface, which may be configured to face the support side face of the expandable curtain. The tether may be attached at a first location to the expandable bladder and attached at a second location such that in the deployed state of the expandable curtain the tether extends behind the rear side face of the transverse portion of the expandable curtain and frictionally engages the rear side face of the expandable curtain. By extending behind the expandable curtain and engaging the rear side face of the curtain in a deployed state, the tether creates a frictional coupling or engagement between the expandable curtain and the expandable bladder. The frictional coupling or engagement can stabilize the expandable bladder during deployment or in a deployed state by inhibiting, resisting, or preventing movement of the expandable bladder, e.g., preventing movement in a substantially lateral or side-to-side direction, such as from one lateral or interior side of the vehicle to another lateral or interior side of the vehicle. Limiting or preventing such movement may therefore provide stability to the expandable bladder during deployment and provide optimum protection to an occupant during a collision.

The second location at which the tether may be attached may be a location that allows the occupant protection system to be stowed in an advantageous manner for deployment. In examples, the second location may be (i) a vehicle roof or an area associated with the vehicle roof, or (ii) a portion of the expandable curtain, e.g., a proximal or end portion of the expandable curtain located near the vehicle roof and away from the vehicle floor. Such locations may allow, for example, at least a portion of the expandable curtain to be stowed in a formation in which the tether does not imped movement of the curtain and/or the bladder during deployment, e.g., a coil formation. In examples, the expandable curtain may comprise first and second portions. The first portion may be positioned closer to the roof or inflators than the second portion (e.g., closer to a top area of the roof and/or further from the floor than the first portion) and may be configured to be stowed in a formation or arrangement that minimizes resistance to expansion during deployment, allowing the first portion to expand initially with a force sufficient to, for example, cause the expandable curtain to break through the vehicle roof (e.g., a ceiling trim panel), while minimizing stress the expandable curtain material receives from the gas of the inflator during the initial deployment.

In examples, the second location at which the tether may be attached may be a location between (i) the first portion of the expandable curtain in which the curtain is configured to be stowed in a first formation, and (ii) the second portion of the expandable curtain in which the curtain is configured to be stowed in a second, different formation. In further examples, the second location at which the tether may be attached may be any location above the second portion of the expandable curtain in which the curtain is configured to comprise the second formation. In examples, the second portion may be configured in the stowed state to comprise a formation or arrangement that allows the expandable curtain to fall freely during deployment, e.g., a coiled or rolled-up formation, and the attachment of the tether at the second location may allow the second portion to deploy without the tether impeding movement of the curtain and/or bladder during deployment.

FIG. 1 is a side cutaway view showing an interior 100 of an example vehicle 102 of the present disclosure including a pair of occupants 104. The example vehicle 102 may be configured to travel via a road network from one geographic location to a destination carrying one or more of the occupants 104. For example, interior 100 may include seats 106, which may be provided in any relative arrangement. Example vehicle 102 shown in FIG. 1 includes an example carriage-style seating arrangement in a substantially central portion of the interior 100 of the vehicle 102. For example, the vehicle 102 may include two or more rows 108 of seats 106, and in some examples, two of the rows 108 of seats 106 may face each other, for example, as shown in FIG. 1. One or more of the rows 108 of the seats 106 may include two seats 106 (e.g., seats 106A and 106B). Other relative arrangements and numbers of seats 106 are contemplated.

For purpose of illustration, the vehicle 102 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 102 may be configured to control all functions from start to completion of the trip, including all parking functions, it may not include a driver and/or controls for driving the vehicle 102, such as a steering wheel, an acceleration pedal, and/or a brake pedal. This is merely an example, and the systems, vehicles occupant protection systems, expandable bladders and methods described herein may be incorporated into any ground-borne, airborne, or waterborne vehicle, including those ranging from vehicles that need to be manually controlled by a driver at all times, to those that are partially or fully autonomously controlled.

The example vehicle 102 may be any configuration of vehicle, such as, for example, a van, a sport utility vehicle, a cross-over vehicle, a truck, a bus, an agricultural vehicle, and a construction vehicle. The vehicle 102 may be powered by one or more internal combustion engines, one or more electric motors, hydrogen power, any combination thereof, and/or any other suitable power sources. Although the example vehicle 102 has four wheels 110, the systems and methods described herein may be incorporated into vehicles having fewer or a greater number of wheels, tires, and/or tracks. The example vehicle 102 may have four-wheel steering and may operate generally with equal performance characteristics in all directions, for example, such that a first end 112 of the vehicle 102 is the front end of the vehicle 102 when travelling in a first direction 114, and such that the first end 112 becomes the rear end of the vehicle 102 when traveling in the opposite, second direction 116, as shown in FIG. 1. Similarly, a second end 118 of the vehicle 102 is the front end of the vehicle 102 when travelling in the second direction 116, and such that the second end 118 becomes the rear end of the vehicle 102 when traveling in the opposite, first direction 114. These example characteristics may facilitate greater maneuverability, for example, in small spaces or crowded environments, such as parking lots and urban areas.

As shown in FIG. 1, the vehicle 102 may include an occupant protection system 120 configured to protect one or more of the occupants 104 during a collision involving the vehicle 102. For example, the occupant protection system 120 may include one or more expandable bladders 124 and a deployment control system 126. The occupant protection system 120 may in examples further comprise one or more expandable curtain 122. The deployment control system 126 may be configured to control deployment of one or more of the expandable curtains 122 and one or more of the expandable bladders 124, so that they deploy from a stowed state, for example, as shown in FIG. 1, to one or more deployed states (e.g., expanded states or at least partially expanded states), for example, as shown in FIGS. 2-5, 7A-7C and 9. In some examples, the occupant protection system 120 may also include a seatbelt system that includes a seatbelt for each of one or more of the occupants 104, for example, as explained in more detail herein. The expandable curtain 122 and/or the expandable bladders 124 may be formed from, for example, a woven nylon fabric and/or other similar materials, or materials having suitable characteristics for the vehicles and occupant protection systems described herein.

As shown in FIG. 1, the example vehicle 102 may include a chassis 128 including a vehicle roof 130 having a housing 132 configured to receive the expandable curtain(s) 122 and/or the expandable bladder(s) 124, each in the stowed state (e.g., unexpanded state). In some examples, the expandable curtain(s) 122 and/or expandable bladder(s) 124 may be stored individually in separate housings. In some examples (e.g., those examples where portions of the expandable curtain(s) are separate), each portion may be stored individually in separate housings. In some examples, upon receipt of one or more signals from the vehicle 102, the deployment control system 126 may be configured to activate one or more inflators 134 in fluid or flow communication with the expandable curtain(s) 122 and/or the expandable bladder(s) 124, such that the inflators 134 provide a fluid or gas to the expandable curtain(s) 122 and/or the expandable bladder(s) 124, so that that the expandable curtain(s) 122 and/or the expandable bladder(s) 124 may expand from their stowed state (FIG. 1) to their respective deployed states, for example, as shown in FIGS. 3-5, 7A-7C, and 9. For example, the inflators 134 may include a gas generator, pyrotechnic charge, propellants, and/or any other suitable devices or systems. In examples, a ceiling trim panel of a ceiling of the vehicle 102 may at least partially define the housing 132, and the housing 132 may be coupled to the ceiling and/or the vehicle roof 130 of vehicle 102. Additional details of example housings, ceilings, ceiling trim panels, and occupant protection systems that operate with activatable inflators for expanding bladders and curtains may be found, for example, in U.S. patent application Ser. No. 16/368,603 (U.S. Pat. No. 10,960,844), the entire contents of which is incorporated herein for all purposes.

The expandable curtain(s) 122 and/or expandable bladder(s) 124 may be configured to deploy in, for example, less than 100 milliseconds or less than 50 milliseconds (e.g., a second phase of the deployed state as mentioned herein may in examples be completed in less than 100 or less than 50 milliseconds). In one example the expandable bladder may be configured to expand in 70 milliseconds. In one example, the deployed state may include first and second phases as described U.S. application Ser. No. 17/555,206 mentioned and discussed further below and which is incorporated herein by reference in its entirety for all purposes. In examples herein the first phase may occur in 45 milliseconds or less. As explained herein, the expandable curtain(s) 122 and/or the expandable bladder(s) 124, in the deployed state may protect an occupant 104 from injury (or reduce its likelihood or severity) during a collision involving the vehicle 102 by providing a cushion between the occupant 104 and interior structures of the vehicle 102, so that the occupant 104 will be prevented from being thrown into the interior structures and/or, in some instances, being ejected from the vehicle 102.

Figure 2:
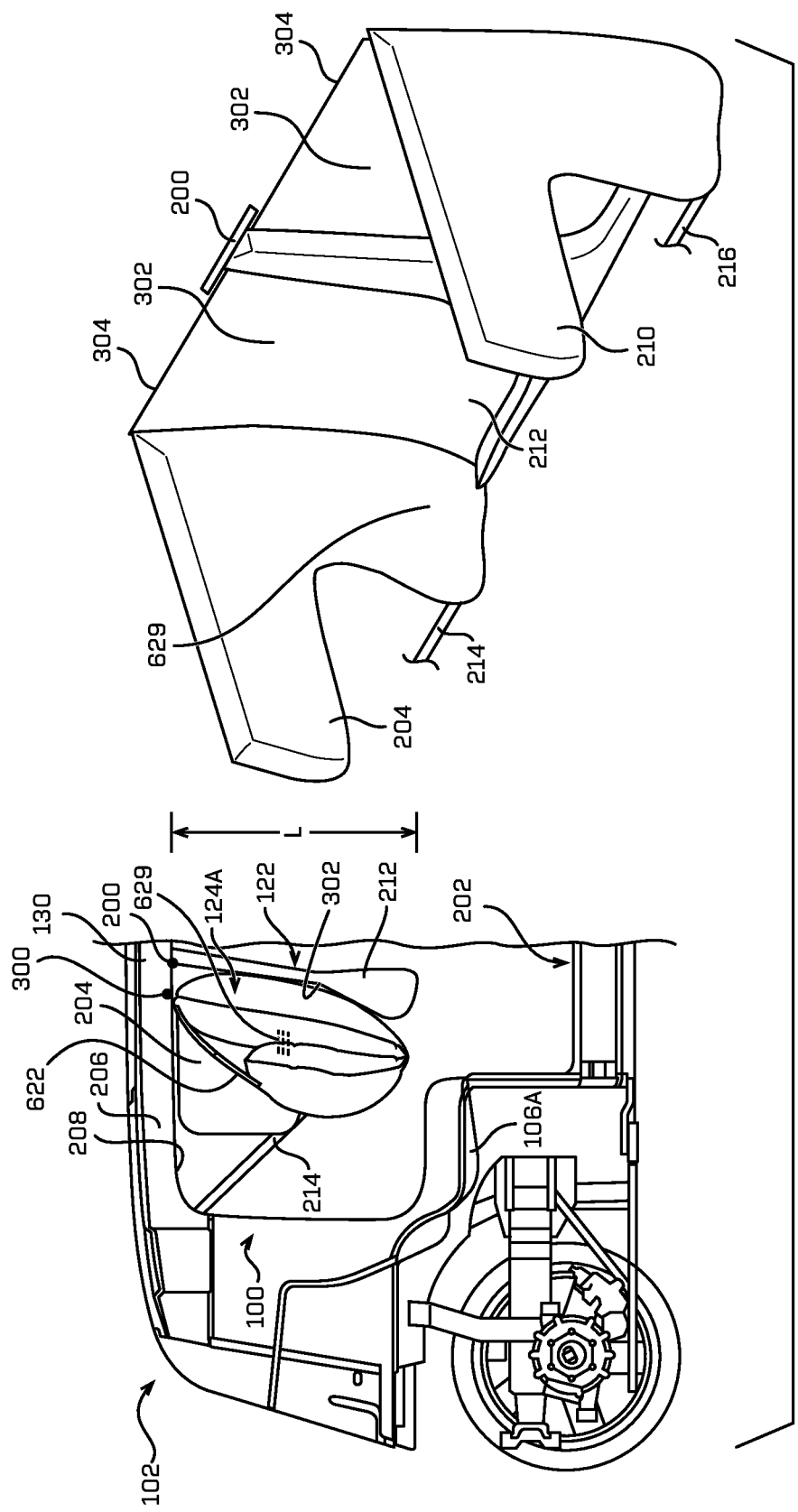
FIG. 2 is a partial side view of the example vehicle shown in FIG. 1 with an example expandable curtain in a deployed state.
Figure 3:
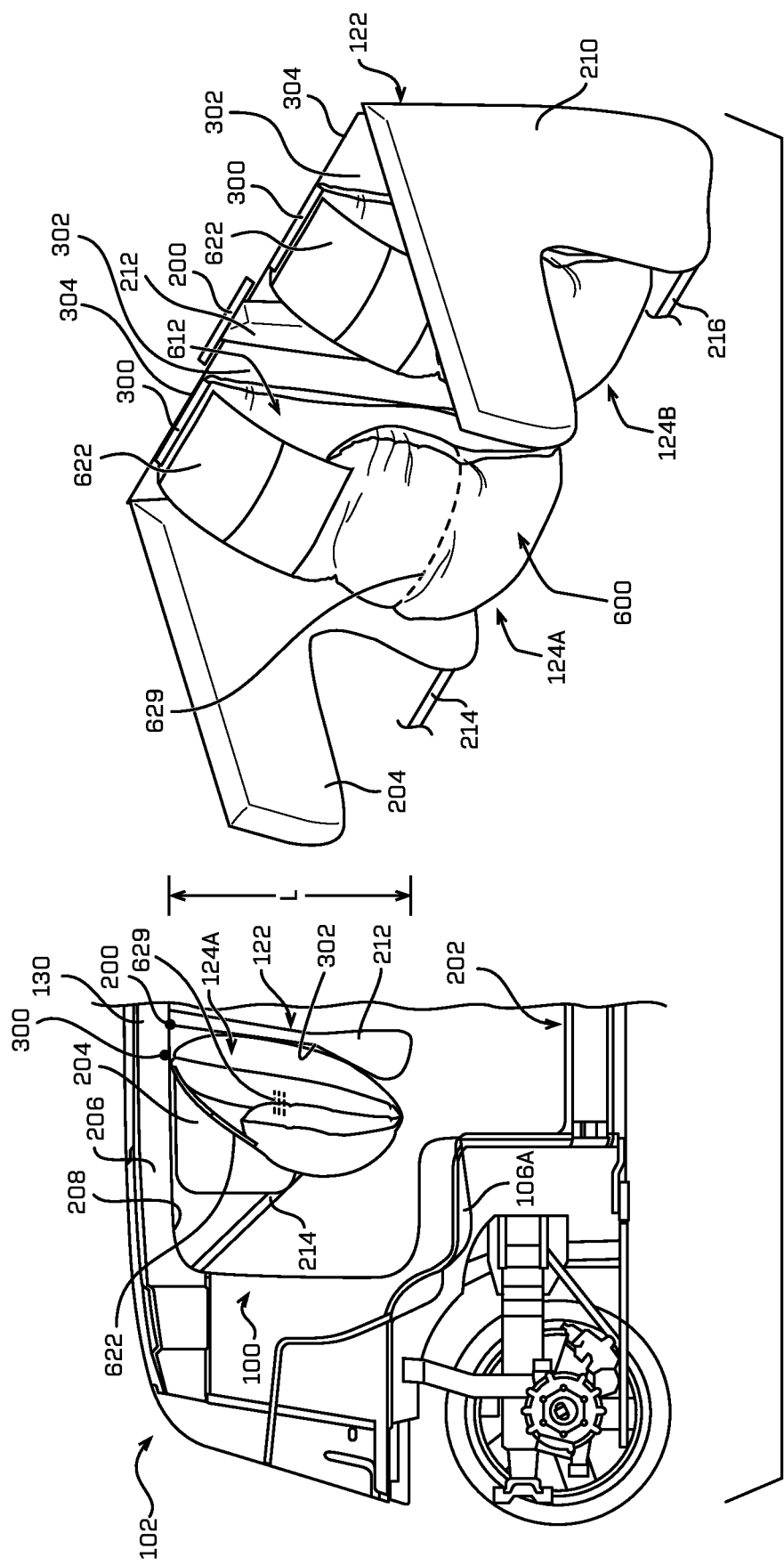
FIG. 3 is a partial side view of the example vehicle shown in FIG. 1 with an example expandable curtain in a deployed state and example expandable bladders in a deployed state.

FIGS. 2 and 3 are side views of a portion of the example vehicle 102 shown in FIG. 1 with the occupants 104 omitted to aid clarity. FIG. 2 shows an example expandable curtain 122 in a deployed (e.g., expanded or at least partially expanded) state in the interior 100 of the vehicle 102. In the example shown, the expandable curtain 122 has been deployed from the vehicle roof 130 and is coupled to the vehicle roof 130 at an attachment point 200. In some examples, the expandable curtain 122 may be indirectly coupled to and supported by the vehicle roof 130, for example, via an intermediate coupling. The example expandable curtain 122 may be configured to be expanded from a stowed state, for example, as shown in FIG. 1, to a deployed state having a length L as shown in FIGS. 2 and 3. The expandable bladder 124 may likewise be configured to be expanded from a stowed, for example, as shown in FIG. 1 state to a deployed as shown, for example, in FIGS. 3-5 and 7A-7C and having a length L as shown in FIG. 3. As shown, in some examples, the expandable curtain 122 extends toward the vehicle floor 202 and terminates at a location spaced above the vehicle floor 202. In some examples, the expandable curtain 122 may extend to and terminate at the vehicle floor 202. In illustrated examples, the expandable curtain 122 in the deployed state may include a first side 204 configured to extend along a portion of a first interior or lateral side 206 of the vehicle 102. For example, the first side 204 of the expandable curtain 122 may extend in a direction substantially parallel to the first interior side 206 of the vehicle 102. In some examples, the first side 204 of the expandable curtain 122 may be deployed from a housing located above the opening 208 in the first interior side 206 and/or from the vehicle roof 130 of the vehicle 102. In some examples, the first side 204 of the expandable curtain 122 may be inflatable and may be configured to provide cushioning between the occupant 104 and the first interior side 206 of the vehicle 102.

In some examples, the expandable curtain 122 may also include a second side 210 opposite the first side 204 configured to extend along a portion of a second interior or lateral side (not shown in FIG. 2 due to limitations of the view provided) of the vehicle 102. The first and second interior sides of the vehicle 102 may be on opposite sides of the vehicle 102 and may extend substantially parallel to one another. It should therefore be appreciated that in examples, the second interior side may be considered to be located on an opposite lateral side of vehicle 102 from the first interior side 206. Thus, it should also appreciated that, in examples, a lateral or side-to-side movement or direction in the illustration of FIGS. 1-3 may be considered a direction into and out of the paper, whereas a longitudinal direction may be considered a direction extending generally from the first end 112 of the vehicle 102 to the second end 118 of the vehicle 102, or from the second end 118 of the vehicle 102 to the first end 112 of the vehicle 102. In some examples, the second side 210 of the expandable curtain 122 may have structural, location, stowage, and/or deployment characteristics similar to, or the same as, the first side 204 of the expandable curtain 122, except that it may be located on the second interior side of the vehicle 102 and may be different to accommodate differences with being on the second interior side of the vehicle 102 instead of the first interior side 206.

The example expandable curtain 122 also includes a transverse portion 212 extending between the first side 204 and the second side 210 of the expandable curtain 122. In some examples, the first side 204, the second side 210, and the transverse portion 212 of the expandable curtain 122 form a contiguous barrier. For example, the first side 204, the second side 210, and the transverse portion 212 of the expandable curtain 122 may define or comprise a substantially horseshoe like shape or define or comprise a substantially U-shaped cross-sectional area as created by a plane normal to length extending downward from the roof 130 to the floor 202. In some examples, one or more of the first side 204, the second side 210, or the transverse portion 212 of the expandable curtain 122 may include one or more additional expandable portion (e.g., a channel) located adjacent the vehicle roof 130. The one or more additional expandable portions may assist the deployment of the first side 204, second side 210, and/or transverse portion 212 from the housing 132 upon initiation of the deployment of the expandable curtain 122. For example, the one or more additional expandable portions may assist with forcing open portions of an interior trim of the vehicle 102 configured to permit the expandable curtain to deploy from underneath the trim of the vehicle. Additional details of example trims operating with expandable curtains and bladders may be found, for example, in U.S. patent application Ser. No. 16/368. (U.S. Pat. No. 10,960,844), the entire contents of which is incorporated herein for all purposes.

In some examples, the occupant protection system 120 may include a first tether 214 coupled to the first side 204 and/or transverse portion 212 of the expandable curtain 122 and coupled to a portion of the vehicle 102, such as, for example, a portion associated with (e.g., directly or indirectly coupled to) the first interior side 206 (e.g., an interior panel or a structural member of the vehicle chassis 128) the floor 202, or the roof 130 of the vehicle 102, for example. For example, the first tether 214 may at one end be coupled to a free edge of the first side 204 of the expandable curtain 122, and at a second end coupled to an anchor associated with the first interior side 206 of the vehicle 102 and/or the vehicle roof 130. The occupant protection system 120 may also include a second tether 216 coupled to the second side 210 and/or transverse portion 212 of the expandable curtain 122 and configured to be coupled to a portion of the vehicle 102, such as, for example, a portion associated with (e.g., directly or indirectly coupled to) the second interior side, the floor 202, or the roof 130 of the vehicle 102, for example, in manner at least similar to the first tether 214. In some examples, the first and second tethers 214 and 216 may assist with preventing the expandable curtain 122, once deployed, from swinging in a direction away from the occupant 104 during the collision, for example, as the occupant 104 contacts the expandable curtain 122, either directly or indirectly, as explained herein. The tether(s) 214, 216 and any of the other tethers described herein may be made of any material(s) with suitable characteristics for the vehicles and occupant protection systems herein, e.g., woven nylon fabric and/or other similar materials.

FIG. 3 shows an example occupant protection system 120 with example expandable curtain 122, a first example expandable bladder 124A and a second example expandable bladder 124B, each in a deployed (e.g., expanded or at least partially expanded) state. The deployed state shown in FIG. 3 is shown as an example of a first phase or first deployed state, as discussed further herein. It should be appreciated that in various examples, the occupant protection systems herein may not include an expandable curtain 122. The example expandable curtain 122 and/or the example expandable bladders 124A, 124B may be configured to be expanded from a stowed state, for example, as shown in FIG. 1, to the first phase or first deployed state, for example, as shown in FIG. 2. In some examples, the expandable curtain 122 may be indirectly coupled to and supported by the vehicle roof 130, for example, via an intermediate coupling.

In the example shown, each of the expandable bladders 124A, 124B has been deployed from the vehicle roof 130 and coupled to the vehicle roof 130 at attachment points 300. For example, the expandable bladders 124A, 124B shown in FIG. 3 have expanded from a stowed state to a first deployed state or phase (as discussed further herein), and are associated with (e.g., directly or indirectly coupled to) the transverse portion 212 of the expandable curtain 122, for example, such that the expandable curtain 122 may support the expandable bladders 124A, 124B when an occupant 104 contacts one of the expandable bladders 124A or 124B as the occupant 104 is urged forward in the direction toward which the seat 106 is facing and into the expandable bladders 124A,124B (i.e., from left-to-right as shown in FIG. 3). For example, the transverse portion 212 of the expandable curtain 122 includes a front side or support side face 302 facing the seat 106 and the expandable bladders 124A and 124B, and as the occupant 104 contacts one of the expandable bladders 124A or 124B, the expandable bladder 124A or 124B presses against the support side face 302 of the expandable curtain 122. The transverse portion 212 of the expandable curtain 122 further includes a rear side or rear side face 304, which is opposite or faces an opposite direction as the support side face 302 and may be understood as being located or positioned on the back or rear side of the transverse portion 212 or the back or rear side of the expandable curtain 122 itself.

The expandable curtain 122 is suspended from the vehicle roof 130 (or adjacent thereto) at the attachment point 200 and is supported by the first and/or second tethers 214 and 216, which prevent the expandable curtain 122 from swinging freely about the attachment point 200 forward in the direction in which the seat 106 is facing and the direction in which the occupant 104 is moving. In this example manner, the occupant protection system 120 may protect the occupant 104 during a collision involving the vehicle 102, by preventing the occupant 104 from colliding in an un-cushioned or unprotected manner with interior structures of the vehicle 102 and/or, in some instances, preventing the occupant 104 from being ejected from the vehicle 102.

In the example shown in FIGS. 2 and 3, at least a portion of the first side 204 of the expandable curtain 122 and at least a portion of the second side 210 of the expandable curtain 122 extend away from the support face side 302 of the of the transverse portion 212 of the expandable curtain 122. In some examples, one or more of the expandable bladders 124A or 124B may be associated with (e.g., directly or indirectly coupled to) the support face side 302 of the transverse portion 212 and may be located between the first side 204 and the second side 210 of the expandable curtain 122, for example, as shown in FIGS. 2 and 3.

The first expandable bladder 124A and/or the second expandable bladder 124B may each be configured to expand from a stowed state to a deployed state associated with the transverse portion 212 of the expandable curtain 122, for example, as shown in FIG. 3. In some examples, the first expandable bladder 124A and/or the second expandable bladder 124B may be coupled to the transverse portion 212 of the expandable curtain 122. In some examples, the first expandable bladder 124A and/or the second expandable bladder 124B may not be coupled to the transverse portion 212 of the expandable curtain 122. For example, the first and/or second expandable bladder may be coupled, directly or indirectly, to the vehicle roof 130 independently of one another and/or independently of the expandable curtain 122.

In some examples, the first side 204, the second side 210, and/or the transverse portion 212 of the expandable curtain 122 may be configured such that when the expandable curtain 122 is deployed, a lower edge of the transverse portion 212 is closer to the seat 106 toward which the first side 204 and second side 210 extend than the upper portion of the transverse portion 212, thereby resulting in the transverse portion 212 extending downward toward the floor of the vehicle 102 and creating an angle relative to vertical, for example, as shown in FIG. 3. This angle may be created by a contraction of the first side 204 and/or the second side 210 as the expandable curtain 122 is deployed. This example configuration results the lower edge of the expandable curtain 122 being closer to the lower portion of the chest an occupant in the seat 106 than an upper portion of the chest and/or head of the occupant upon deployment. This creates a surface against which the first and/or second expandable bladders 124A and 124B may react and which results in arresting the lower portion of the chest of the occupant and allowing the upper chest and/or head of the occupant to continue forward and pivot downward into/against one of the expandable bladders 124 as the occupant is arrested by the expandable bladder 124.

In some examples, the deployment control system 126 (FIG. 1) may be configured to cause one or more of the first expandable bladder 124A, the second expandable bladder 124B, or the expandable curtain 122 to expand from a stowed state to a deployed state (e.g., an expanded or at least partially expanded state), for example, by activating one or more inflators 134 (FIG. 1) associated with (e.g., in flow or fluid communication with) one or more of the first expandable bladder 124A, the second expandable bladder 124B, or the expandable curtain 122. The first expandable bladder 124A, the second expandable bladder 124B, and the expandable curtain 122 may be deployed together, concurrently or substantially simultaneously, or may be deployed independently of one another. For example, the deployment control system 126 may be configured to cause the expandable curtain 122 to deploy and/or expand from the stowed state to the deployed state at a first time, and thereafter cause the first expandable bladder 124A and/or the second expandable bladder 124B to expand from the stowed state to the deployed state at a second time following the first time. In some examples, the first expandable bladder 124A or the second expandable bladder 124B may be deployed individually, for example, without necessarily deploying the other of the expandable bladders. By deploying the expandable curtain 122 and/or the expandable bladders 124A or 124B independently, the packaging of the occupant protection system 120 may be improved by, for example, reducing the size of gas generators associated with (e.g., that may form part of) the inflator(s) 134 and/or the housing(s) 132 used to contain the undeployed first and second expandable bladders 124A and 124B and expandable curtain 122. Additionally, or alternatively, by deploying the expandable curtain 122 and/or the expandable bladders 124A or 124B independently, replacement costs may be minimized, as only those deployed members would need replacing or refurbishing. Additional details of example deployment sequences for expandable bladders and expandable curtains may be found, for example, in U.S. patent application Ser. No. 16/368,603 (U.S. Pat. No. 10,960,844), the entire contents of which is incorporated herein for all purposes.

The example vehicle 102 shown in FIGS. 1-3 may include a first seat 106A (FIG. 1 1) coupled to a portion the vehicle 102 and facing the first direction 114 relative to a longitudinal axis of the vehicle 102, and the vehicle 102 may also include a second seat 106B (FIG. 1) coupled to a portion the vehicle 102 and facing a second direction 116 opposite the first direction 114. In some examples of the occupant protection system 120, the first side 204 of the expandable curtain 122 and the second side 210 of the expandable curtain 122 may extend from the transverse portion 212 of the expandable curtain 122 in the second direction 116 toward the first seat 106A. The first expandable bladder 124A may be configured to deploy between the transverse portion 212 of the expandable curtain 122 and the first seat 106A.

Examples of the vehicles and occupant protection systems herein may include first and second expandable curtains at least partially stowed in a portion of the vehicle 102 and configured to be expanded from a stowed state to a deployed state extending between the vehicle roof 130 and the vehicle floor 202. Further details of various example first and second expandable curtains and bladders are discussed in U.S. application Ser. No. 15/963,641 (U.S. Pat. No. 10,471,923), which is incorporated herein by reference in its entirety for all purposes. In some examples, protection may be provided for occupants of seats facing both directions. For example, the seats 106A and 106B may face one another, for example, as shown in FIG. 1, and the first and second expandable curtains 122A and 122B may be configured to deploy between the two seats 106A and 106B. In some examples, the deployment control system 126 may be configured to receive one or more signals indicative of a direction of travel of the vehicle 102, and cause deployment of the first expandable curtain and/or the second expandable curtain. For example, the first expandable curtain, the first expandable bladder 124A, the second expandable curtain 122B, and/or the second expandable bladder 124B may be deployed based at least in part on the one or more signals indicative of the direction of travel of the vehicle 102.

For example, if the vehicle 102 is traveling with the first seat 106A facing the direction of travel (e.g., the first direction 114), before or during a collision, the deployment control system 126 may deploy the first expandable curtain and/or the first expandable bladder (e.g., associated with (e.g., within an effective distance from) the first seat 106A), and if the vehicle 102 is traveling with the second seat 106B facing the direction of travel (e.g., the second direction 116), before or during a collision, the deployment control system 126 may deploy the second expandable curtain and/or the second expandable bladder (e.g., associated with (e.g., within an effective distance from) the second seat 106B).

Turning now to FIGS. 4A-6, these figures generally illustrate example expandable bladders 124A, example expandable curtains 122 and example tethers 700 for a vehicle 102 including an occupant protection system 120 in which the tethers 700 are attached at a first location to the expandable bladder 124A and at a second location to the expandable curtain 122 or the roof 130 such that a frictional engagement or coupling is created between the curtain 122 and the tether 700 during deployment or in the deployed state of the occupant protection system 120. In examples, the attachment of the tether 700 at the second location to the expandable curtain 122 may be an attachment to a proximal or end portion of the expandable curtain. Such proximal portion of the curtain 122 may be considered a portion that is generally positioned near the vehicle roof 130, near the inflator of the occupant protection system 120, and/or positioned away vertically from the vehicle floor 202. The attachment of the tether 700 at the second location to the vehicle roof 130 may similarly be considered an attachment at a location near the inflator, the vehicle roof, and/or a location generally away from the vehicle floor 202. In examples, the deployed state of the expandable bladder may be a first of two deployed states or phases and may comprise an expandable bladder having a tearable flap 622, e.g., a tearable flap. Details of example occupant protection systems having an expandable bladder with a first and second phases or states of deployment and a releasable connection 622 may be found in U.S. patent application Ser. No. 17/555,206, the entire contents of which is incorporated herein for all purposes. The releasable connection 622 illustrated in FIG. 4A, 5 have been omitted from FIGS. 4B and 4C for ease of illustration. It should be appreciated that other suitable occupant protection system having different expandable curtain and expandable bladders and/or different stowed and/or deployed states may be utilized in any of the vehicles or occupant protection systems described herein including the examples illustrated in FIGS. 4A-6. Further examples of suitable occupant protection systems including suitable expandable bladders, expandable curtains and deployed states may be found, for example, in U.S. application Ser. No. 15/963,641 (U.S. Pat. No. 10,471,923), the entire contents of which is incorporated herein for all purposes.

Figure 4A:
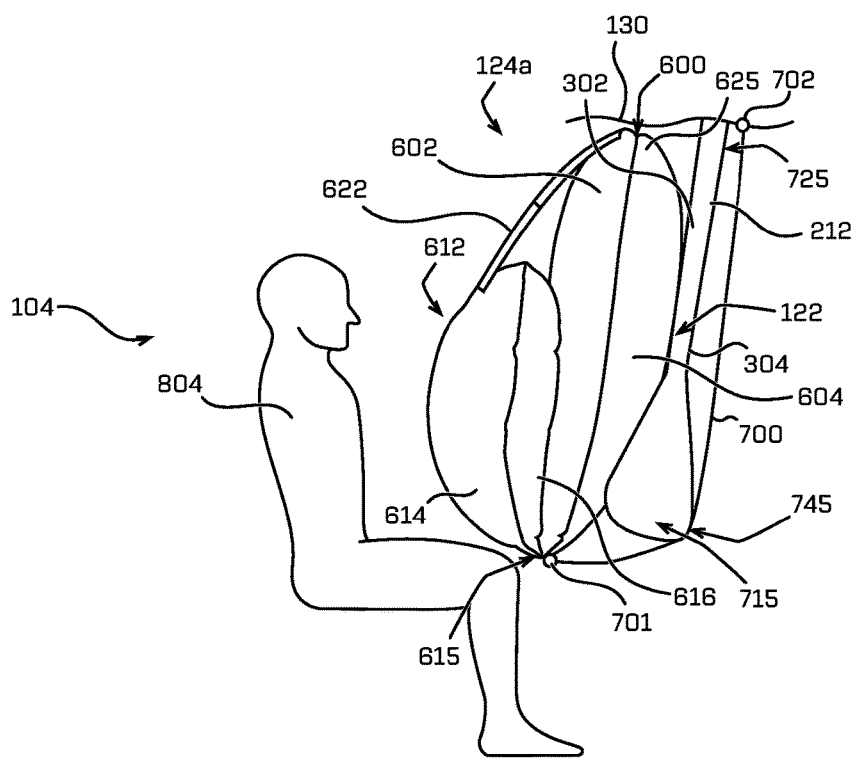
FIG. 4A is a schematic diagram showing an example expandable bladder and expandable curtain with a vehicle occupant before the occupant contacts the expandable bladder and with an example tether attached at a first location to the bladder and at a second location to a vehicle roof.

Referring more specifically to FIG. 4A, FIG. 4A is a schematic diagram showing an example expandable bladder 124A, an example expandable curtain 122 and an example tether 700 for a vehicle including an occupant protection system 120 in a deployed state in which the tether 700 is attached at a first location 701 to the bladder 124 and attached at a second location 702 to the vehicle roof 130. The example expandable bladder 124A may comprise a first or initial expandable chamber 600 and a second or occupant restraining expandable chamber 612. The initial expandable chamber 600 may comprise an occupant facing portion 602 that is configured to generally face in the direction of an occupant or passenger of a vehicle (e.g., occupant 104 in FIG. 1 or occupant 804) in, for example, a deployed state of expandable bladder 124A. The initial expandable chamber 600 may further comprise a rear portion 604 that is configured to generally face a direction opposite to the occupant facing portion 602 in a deployed state of the expandable bladder 124A. The occupant facing portion 602 may comprise or define an opening having a perimeter (the opening and perimeter are not illustrated but described above and in greater detail in U.S. application Ser. No. 17/555,206, the entire contents of which is incorporated herein for all purposes).

The occupant restraining expandable chamber 612 may comprise an occupant contacting portion 614 having a surface that is generally configured to contact or face an occupant or passenger of a vehicle (e.g., passenger 104 in FIG. 1 or passenger 804) in, for example, a deployed state of expandable bladder 124A. The occupant restraining expandable chamber 612 may further comprise a rear portion 616 that is generally opposite the occupant contacting portion 614 in, for example, a deployed state of the expandable bladder 124A. The rear portion 616 of the occupant restraining expandable chamber 612 may comprise or define an opening having a perimeter. In examples, the opening of the rear portion 616 of occupant restraining expandable chamber 612 may be similarly or identically shaped to the opening of occupant facing portion of initial expandable chamber 600. The opening and perimeter of rear portion 616 are not illustrated but described in detail in U.S. application Ser. No. 17/555,206, again, the entire contents of which is incorporated herein for all purposes. In examples, the occupant facing portion 602 of initial expandable chamber 600 may be attached to the rear portion 616 of occupant restraining expandable chamber 612 at or around at least a portion of the respective perimeters of the openings. In examples, the connection or attachment of occupant facing portion 602 to the rear portion 616 at or around at least a portion of perimeters may be via any suitable stitching technique or any other suitable attachment technique(s).

In examples, the example expandable bladder 124A may comprise the releasable connection 622 mentioned herein (e.g., a tearable flap 622), which may be configured to release a connection of the occupant restraining expandable chamber 612 to the initial expandable chamber 602 or to the vehicle (e.g., via a connection, either directly or indirectly, to the vehicle roof 130 or an area associated with the vehicle roof 130). In various examples, an end portion of the releasable connection 622 may be connected to a portion of initial expandable chamber 600, while an opposite end portion of the releasable connection 622 may be connected to another portion of occupant restraining expandable chamber 612. Again, further details of the releasable connection 622 may be found in U.S. application Ser. No. 17/555,206, the entire contents of which is incorporated herein for all purposes. In various examples of vehicles and vehicle occupant protections systems having a frictionally engaging tether described herein, the expandable bladder(s) may not include a releasable connection and/or the openings mentioned above, and the expandable bladder(s) and curtain(s) may be any suitable bladder(s) and/or expandable curtain(s). Details of additional example expandable curtains and/or bladders that may utilized with any of the vehicles and occupant protection systems having a frictionally engaging tether herein may be found, for example, in U.S. application Ser. No. 15/963,641 (U.S. Pat. No. 10,471,923), which is incorporated herein by reference in its entirety for all purposes.

In examples, the expandable bladder 124A may comprise a first panel and a second panel and the second panel may be connected to or attached to the second panel. The first panel may be similarly shaped and sized to the second panel. In some examples, the first panel may be formed of, or comprise, a first generally rectangular flat piece of material, while the second panel may be formed of, or comprise, a second generally rectangular flat piece of material that is similarly shaped and sized to the rectangular flat piece of material of the first panel. The material of the first panel and second panel may in various examples comprise the same material, e.g., woven nylon fabric and/or other similar materials, or materials having suitable characteristics for the vehicles and occupant protection systems described herein. The first panel may comprise an initial expandable section and an occupant restraining section as discussed above. The second panel may similarly comprise an initial expandable section and an occupant restraining section. In examples, the initial expandable chamber may comprise, or be defined by, both the initial expandable section of the first panel and the initial expandable section of the second panel, while the occupant restraining expandable chamber may comprise, or be defined by, both the occupant restraining section of the first panel and the occupant restraining section of the second panel. Further details of such first and second panels and the initial expandable chamber comprising, or being defined by, both an initial expandable section of the first panel and an initial expandable section of the second panel, as well as the occupant restraining expandable chamber comprising or being defined by both the occupant restraining section of the first panel and the occupant restraining section of the second panel may be found in U.S. application Ser. No. 17/555,206, which is incorporated herein by reference in its entirety for all purposes.

Referring now to the tether 700 and the attachment of the tether 700 in the example of FIG. 4A, as shown, the first location 701 at which tether 700 may be attached to the expandable bladder 124A may be a bottom or distal portion 615 of expandable bladder 124A, which is opposite a top or proximal portion 625 of expandable bladder 124A. In examples, the first location 701 of distal portion 615 may be at a bottom most point or location of expandable bladder 124A, which may be located at an area far or generally furthest away from the vehicle roof 130 or closest to the vehicle floor 202 when the expandable bladder 124A is in a deployed state. As shown, the expandable curtain 122 may similarly comprise a bottom or distal portion 715, which is opposite a top or proximal portion 725 of expandable curtain 122. As further shown, the transverse portion 212 of expandable curtain 122 in the deployed state may comprise the front side or support side face 302, which faces expandable bladder 124A, and the rear side or rear side face 304, which is opposite or faces an opposite direction as the support side face 302 and may be understood as being located or positioned on the back side, rear side or behind the transverse portion 212 and/or the expandable curtain 122 itself. Thus, it should be appreciated that the tether 700 may be configured or arranged to extend from the first attachment location 701 at the expandable bladder 124A behind the expandable curtain 122 to the second attachment location 702 at the vehicle roof 130. Such an arrangement or configuration allows, during deployment (or the deployed state) of the occupant protection system 120, the rear side face 304 of the expandable bladder 124A to frictionally engage with the tether 700 to create a frictional coupling or engagement 745 between the expandable bladder 124A and the expandable curtain 122. The frictional engagement or coupling 745 limits or prevents movement of the expandable bladder 124A during deployment (or in the deployed state) by, for example, limiting or preventing lateral or side-to-side direction, such as from one lateral or interior side of the vehicle to another lateral or interior side of the vehicle (e.g., into and out of the paper in FIG. 4A for example), thus maximizing protection of the occupant during a collision of the vehicle. In various examples, the first location 701 and second location 702 may be any suitable location on the expandable bladder 124A and the vehicle roof 130, respectively, that may create such a frictional coupling or engagement. In examples, the frictional engagement or coupling 745 illustrated in FIG. 4A (and illustrated in any of the other examples described herein) may be a be frictional engagement or coupling that extends along any portion of the rear side face 304 of the expandable curtain 212. In other words, the frictional engagement or coupling in any of the vehicles or vehicle occupant protection systems herein may be a friction that occurs at any point of the tether(s) that extends behind the curtain and any portion of the rear side faces of any of the expandable curtains herein. The manner in which any of the tethers 700 herein are attached at any of the first or second locations 701, 702 herein may be any type of attachment suitable for holding or securing the tether(s) 700 during deployment and possible collision in a vehicle.

Figure 4B:
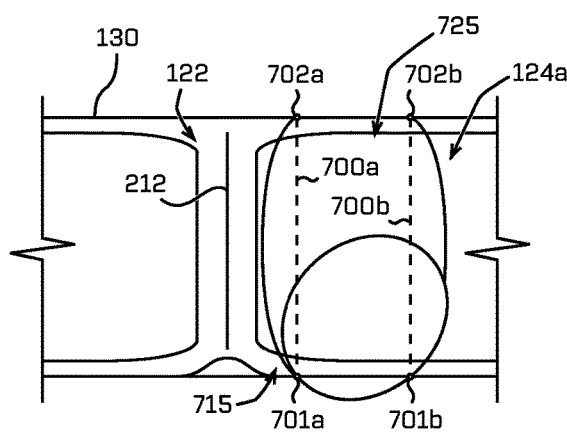
FIG. 4B is a partial front view of an example expandable bladder and example expandable curtain with example tethers extending generally parallel and behind the expandable curtain and attached at first locations to the expandable bladder and attached at second locations to a vehicle roof.
Figure 4C:
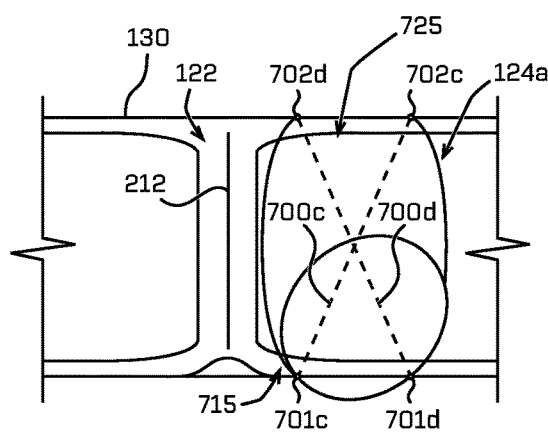
FIG. 4C is a partial front view of an occupant protection system comprising an expandable bladder supported by an example expandable curtain with example tethers extending behind the expandable curtain crossing each other and attached at first locations to the expandable bladder attached at second locations to a vehicle roof.

Referring now to the examples of FIGS. 4B and 4C, these figures are partial front views of an example expandable bladder 124A and example expandable curtain 122 in which multiple example tethers 700a-700d extend behind the expandable curtain 122 and each tether 700a-700d is attached at a first location, 701a-701d, respectively, to the expandable bladder 124A and attached at a second location 702a-702d, respectively, to the vehicle roof 130. In particular, FIG. 4B shows example tethers 700a, 700b extending generally or substantially parallel to one another behind expandable curtain 122. Tether 700a is attached to expandable bladder 124A at a first location 701a and extends from first location 701a to behind expandable curtain 122 (as illustrated by the dashed lines) where the tether 700a is also attached at a second location 702a to vehicle roof 130 so as to create a frictional engagement or coupling during deployment or in the deployed state. Tether 700b is attached to the expandable bladder 124A at a first location 701b and extends from first location 701b to behind expandable curtain 122 (as illustrated by the dashed lines) where the tether 700b is also attached at a second location 702a to vehicle roof 130 so as to create a frictional engagement or coupling during deployment or in the deployed state. Thus, the arrangement or configuration of each tether 700a, 700b creates a frictional engagement or coupling 745 between the rear side face 304 of the expandable curtain 122 and each tether 700a, 700b during deployment (or in the deployed state), e.g., to limit or prevent a lateral or side-to-side movement such as from one lateral or interior side of the vehicle to another lateral or interior side of the vehicle (into and out of the paper in FIG. 4B for example) to maximize protection of the occupant during a collision of the vehicle.

FIG. 4C shows example tethers 700c, 700d crossing one another behind expandable curtain 122, e.g., forming an X or X like shape. In other examples, while the tethers 700c, 700d may cross one another behind curtain 122, the shape the crossed tethers form may be crossed shape different from an X or X like shape. Tether 700c may be attached to expandable bladder 124A at a first location 701c and extend from first location 701c to behind expandable curtain 122 (as illustrated by the dashed lines) where the tether 700a may also attach at a second location 702c to vehicle roof 130 so as to create a frictional engagement or coupling during deployment or in the deployed state. Tether 700d may be attached to the expandable bladder 124A at a first location 701d and extend from first location 701d to behind expandable curtain 122 (as illustrated by the dashed lines) where the tether 700d may also attach at a second location 702d to vehicle roof 130 so as to create a frictional engagement or coupling during deployment or in the deployed state. Thus, it should be appreciated that in this example, the arrangement or configuration of each tether 700c, 700d creates a frictional engagement or coupling between the rear side face 304 of the expandable curtain 122 and each tether 700c, 700d during deployment to limit or prevent movement of the expandable bladder 124A in a deployed state (or during deployment), e.g., to limit or prevent a lateral or side-to-side movement such as from one lateral or interior side of the vehicle to another lateral or interior side of the vehicle (into and out of the paper in FIG. 4C for example) to maximize protection of the occupant during a collision of the vehicle.

Figure 5:
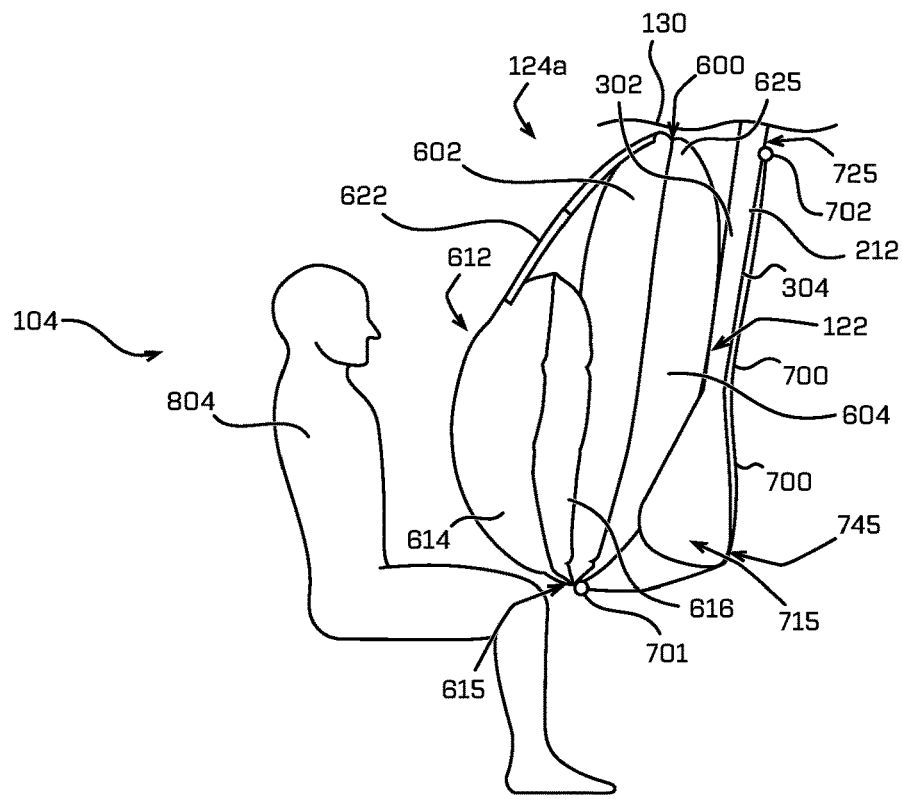
FIG. 5 is schematic diagram showing an example expandable bladder and curtain with a vehicle occupant before the occupant contacts the bladder and with an example tether extending behind the curtain and attached at a first location to the expandable bladder and attached at a second location to the expandable curtain.

FIG. 5 is similar to FIG. 4A and is a schematic diagram showing an example expandable bladder 124A, an example expandable curtain 122 and an example tether 700 for a vehicle including an occupant protection system 120 in a deployed state in which the tether 700 is attached at a first location 701 to the bladder 124A and attached at a second location 702 so as to create, during deployment (or in a deployed state), a frictional engagement or coupling between the curtain 122 and the tether 700. Here, the second location 702 to which the tether 700 is attached may be a location on the expandable curtain 122 (rather than the vehicle roof 130 like FIGS. 4A-4C). In these examples, the second location 702 on the expandable curtain 122 may be any location on the expandable curtain 122 that enables the tether 700 to extend behind the curtain 122 such that the tether 700, during deployment (or in a deployed state), creates a frictional engagement or coupling with the rear face 304 of the curtain 122 so as to limit or prevent movement of the expandable bladder. In various examples, the tether 700 may be attached to a proximal portion 725 of expandable curtain 122, at a mid point or mid portion of a vertical length of the expandable curtain 122 in a deployed state, or any portion above the mid point of mid portion of a vertical length of curtain 122 in the deployed state. Like in the examples described with respect to FIGS. 4B, 4C, the example tether 700 described and illustrated in FIG. 5 may in examples comprise more than one tether and each tether may extend behind the expandable curtain 122 and attach at the second location to expandable curtain 122. In examples, such multiple tethers that attach at the second location to the expandable curtain 122 may cross one another (like the illustrated example of FIG. 4C) or extend generally or substantially parallel to each other (like the illustrated example of FIG. 4B).

Figure 6:
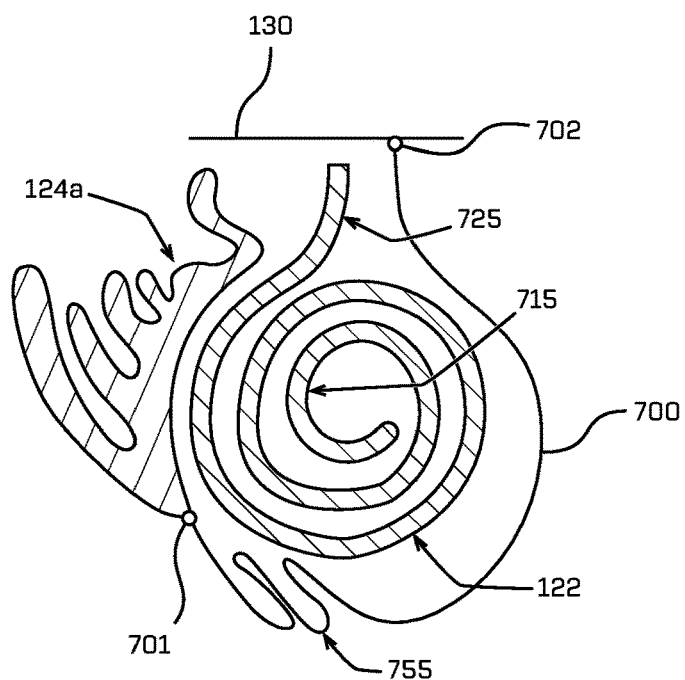
FIG. 6 is a schematic cross sectional view of an example expandable curtain and example expandable bladder in an example stowed state in which the expandable curtain is stowed in a coil formation and an example tether is attached at a first location to the expandable bladder and attached at a second location to a vehicle roof.

Turning now to FIG. 6, FIG. 6 illustrates a schematic cross sectional view of an example expandable curtain 122 and expandable bladder 124A in an example stowed state. Here, the example stowed state of the expandable curtain 122 is a coil or rolled up formation. As mentioned, in examples, the stowed state or stowed position of curtain 122 may be in an area associated with the vehicle roof 130 or in the vehicle roof 130 itself. The expandable curtain 122 may in examples be stowed in the housing 132 described above, and a ceiling trim panel of a ceiling of the vehicle may at least partially define the housing 132 of the vehicle and the housing 132 may be coupled to the ceiling and/or to the vehicle roof 130 of vehicle 102. Additional details of example housings, ceilings, ceiling trim panels, and occupant protection systems having expandable bladders and curtains that operate with housings, ceilings and ceiling trim panels may be found, for example, in U.S. patent application Ser. No. 16/368,603 (U.S. Pat. No. 10,960,844), the entire contents of which is incorporated herein for all purposes.

The illustrated example tether 700 of FIG. 6 is attached at the first location 701 to the expandable bladder 124A and attached at the second location 702 to the vehicle roof 130. In other examples, the attachment at the second location 702 may be an attachment to the expandable curtain 122 rather than to the vehicle roof 130 as described above and, for example, with respect to the examples of FIG. 5. In various examples, the attachment at the second location 702 to the expandable curtain 122 may be to the proximal portion 725 of the curtain 122 as described, for example, with respect to the examples illustrated by FIG. 5. By attaching tether 700 to the vehicle roof 130 (or to the expandable curtain 122 behind the curtain 122 as described), the expandable curtain at least a portion of the curtain 122 may be stowed in a rolled-up or coil formation and deploy without the tether 700 impeding the airbag during deployment. As illustrated, the example tether 700 in the stowed state may comprise slack 755 so that during at least part of the deployment, the tether 700 does not experience tension. It should be appreciated that any of the example vehicle or vehicle occupant protection systems described herein, the tethers 700 may comprise such slack.

Figure 8:
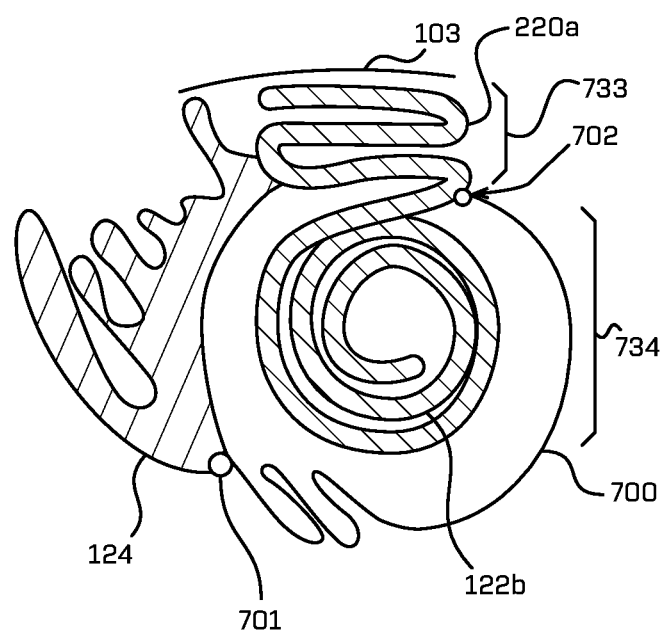
FIG. 8 is a schematic cross-sectional view of an example expandable curtain and bladder in an example stowed state in which the expandable curtain is stowed in first and second example formations with an example tether attached at a first location to the expandable bladder and attached at a second location located between the first and second formations.

Turning now to the examples of FIGS. 7A-8, these examples generally illustrate example expandable bladders 124A, example expandable curtains 122 and example tethers 700 for a vehicle including an occupant protection system 120 in which the tether 700 is attached at a first location to the expandable bladder 124A and attached at a second location to the expandable curtain 122 such that a frictional engagement is created between the curtain 122 and the tether 700 in a deployed state of the occupant protection system 120. In these examples, like the examples above, the deployed state of the expandable bladder may be a first deployed state or a first phase of the deployed state and the occupant protection system 120 may comprise an expandable bladder having a releasable connection 622, e.g., a tearable flap. Details of example occupant protection systems having such an expandable bladder comprising first and second phases of deployment and a releasable connection may be found in U.S. patent application Ser. No. 17/555,206, the entire contents of which is incorporated herein for all purposes. Like in examples above, the releasable connection 622 illustrated in FIG. 7A has been omitted from FIGS. 7B. 7C and 9 for ease of illustration. Also similar to the examples above, the expandable bladder 124A here may comprise first and second panels and an initial expandable chamber comprising, or being defined by, both an initial expandable section of the first panel and an initial expandable section of the second panel, as well as an occupant restraining expandable chamber comprising or being defined by both an occupant restraining section of the first panel and the occupant restraining section of the second panel, details of which may be found in U.S. application Ser. No. 17/555, 206, incorporated herein by reference in its entirety for all purposes.

In the examples of FIGS. 7A-8, the attachment of the tether 700 at the second location 702 to the expandable curtain 122 may be an attachment at a point or area located between a first or top portion 733 of the expandable curtain 122 and a second or bottom portion 734 of the expandable curtain. In examples, such second location 702 may be generally midway, or at a central mid point or area, of the expandable curtain 122 in the deployed state (e.g., at a midway point or middle area as defined by a length in a generally vertical direction, for example, from the vehicle roof to the vehicle floor when the curtain 122 is expanded in the deployed state). In other examples, the second location 702 may be located anywhere generally above the midway, or central mid point or area, of the expandable bladder in the deployed state, i.e., closer to the vehicle roof 130. In examples, the first or top portion 733 of expandable curtain 122 may be stowed in the stowed state in a first formation, while the second or bottom portion 734 of expandable curtain 122 may be stowed in the stowed state in a second formation that is different from the first formation. In examples, the attachment of tether 700 at the second location 702 may be a location between the first formation and the second formation. In various examples, the first formation may be a folded up, zig-zig or accordion formation (See, FIG. 8) and the second formation may be a rolled up or coil formation (See, FIG. 8). In these examples, the attachment of the tether 700 at the second location 702 enables the expandable curtain 122 to be stowed in an advantageous formation to enable expansion during deployment. For example, because the first portion 733 of curtain 122 is located near the gas inflators where gas from the inflators first enters the curtain 122 during deployment, the internal volume of first portion 733 in the stowed state is limited and thus a resistance to expansion is created in that portion 733. To reduce or minimize such resistance to expansion, the first portion 733 may be configured or stowed in a formation that minimizes such resistance so that the first portion 733 is inflated easily. The zig zag folded or accordion formation of first portion 733, for example, provides such reduced or minimized resistance to expansion during initial deployment when the gas first enters the curtain 122 from the gas inflator. The minimized resistance to expansion from such formation also aids the curtain 122 in expanding initially with a force that is sufficient to cause the curtain 122 to break through a ceiling trim panel of the vehicle, while also limiting the amount of stress the gas exerts on the material of the first portion 733 (e.g., the force of the gas from the gas inflator during the initial pyrotechnic event during a collision or expected collision). In examples, the second portion 734 may be configured or stowed in the second formation, which is designed to allow the expandable curtain 122 to fall freely during deployment, e.g., a coiled or rolled-up formation. Attaching the tether 700 at the second location which is a location between the first and second portions 733, 734 (or between the first and second formations formed by those portions), or anywhere above the first portion (or above the first formation) also allows the second portion (or second formation) to deploy in a manner that is unimpeded by the tether 700 or the attachment of the tether 700.

Referring more specifically to the examples of FIGS. 7B and 7C, FIGS. 7B and 7C are similar to FIGS. 4B and 4C and are partial front views of example expandable bladder 124A and example expandable curtain 122 in which multiple example tethers 700e-700h extend generally behind the expandable curtain 122 and in which each tether 700e-700h is attached at a first location 701e-701h, respectively to the expandable bladder 124A and attached at second location 702e-702h, respectively, to the expandable curtain 122. Here, as discussed above, the attachment of the tethers 700e-700h at the second location 702 to the expandable curtain 122 may be an attachment at a point or area located between a first or top portion 733 of the expandable curtain 122 and a second or bottom portion 734 of the expandable curtain 122.

Regarding FIG. 7B, this figures shows example tethers 700e, 700f extending generally or substantially parallel to one another behind expandable curtain 122. Tether 700e is attached to expandable bladder 124A at a first location 701e and extends from first location 701e to behind expandable curtain 122 (as illustrated by the dashed lines) where the tether 700e is also attached at a second location 702e to the expandable curtain 122 so as to create a frictional engagement or coupling during deployment or in the deployed state. Tether 700f is attached to the expandable bladder 124A at a first location 701f and extends from first location 701f to behind expandable curtain 122 (as illustrated by the dashed lines) where the tether 700f is also attached at a second location 702f to the expandable curtain 122 so as to create a frictional engagement or coupling during deployment or in the deployed state. Thus, like in the example illustrated by FIG. 4B, the arrangement or configuration of each tether 700e, 700f in the example of FIG. 7B creates a frictional engagement or coupling between the rear side face 304 of the expandable curtain 122 and each tether 700e, 700f during deployment or in the deployed state to limit or prevent movement of the expandable bladder 124A while being deployed or in a deployed state, e.g., limit or prevent movement in a lateral or side-to-side direction such as from one lateral or interior side of the vehicle to another lateral or interior side of the vehicle (into and out of the paper in FIG. 7B for example) to maximize protection of the occupant during a collision of the vehicle.

Regarding FIG. 7C, this figures shows example tethers 700g, 700h crossing one another behind expandable curtain 122, e.g., forming an X or X like shape. In other examples, the crossing of tethers 700g, 700h behind curtain 122 may form a shape from an X or X like shape. Tether 700g may be attached to expandable bladder 124A at a first location 701g and extend from first location 701g to behind expandable curtain 122 (as illustrated by the dashed lines) where the tether 700g is also attached at a second location 702g to the expandable curtain so as to create a frictional engagement or coupling during deployment or in the deployed state. Tether 700h may be attached to the expandable bladder 124A at a first location 701h and extends from first location 701h to behind expandable curtain 122 (as illustrated by the dashed lines) where the tether 700h is also attached at a second location 702h to the expandable curtain so as to create a frictional engagement or coupling during deployment or in the deployed state. Thus, like the example illustrated by FIG. 4C, the arrangement or configuration of each tether 700g, 700h in the example of FIG. 7C creates a frictional engagement or coupling between the rear side face 304 of the expandable curtain 122 and each tether 700g, 700h during deployment (or in a deployed state) to limit or prevent movement of the expandable bladder 124A (e.g., to limit or prevent a lateral or side-to-side movement such as from one lateral or interior side of the vehicle to another lateral or interior side of the vehicle (into and out of the paper in FIG. 7C for example) to maximize protection of the occupant during a collision of the vehicle. It should be appreciated that the location of the second attachment 702e-702g may be a location as described above generally and the first or top portion 733 of expandable curtain 122 may be stowed in the stowed state in a first formation and the second or bottom portion 734 of expandable curtain 122 may be stowed in the stowed state in a second formation different from the first formation (as described above). In examples, the attachment of tethers 700e-700h at the second location 702 may be a location between the first formation and the second formation and the first formation may be a folded up, zig-zig or accordion formation (See, FIG. 8) and the second formation may be a rolled up or coil formation (See, FIG. 8). The attachment of tethers 700e-700h at the second locations 702e-702h thus enables the expandable curtain 122 to be stowed in an advantageous formation for expansion during deployment, as discussed above.

Figure 9:
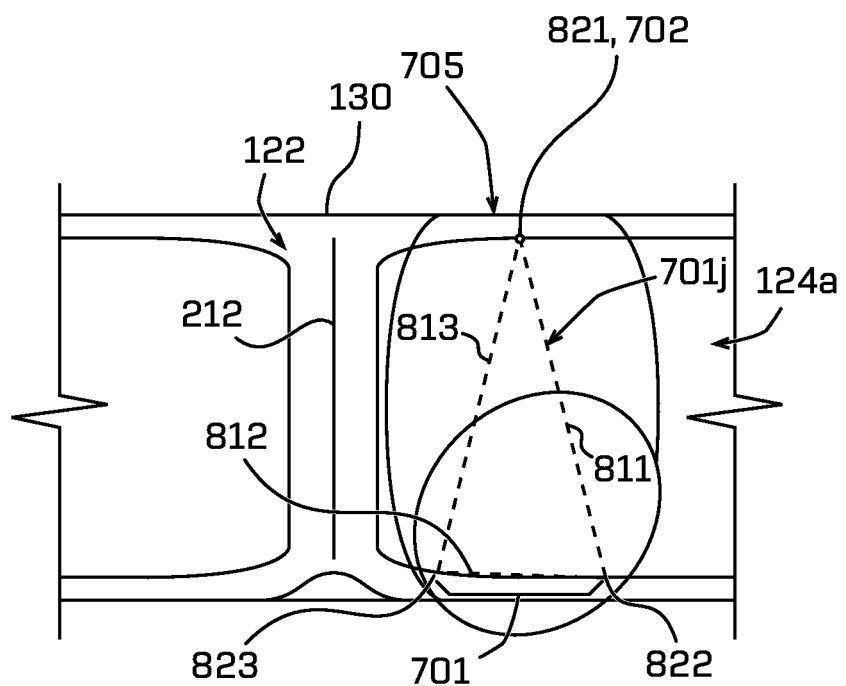
FIG. 9 is a partial front view of an example expandable bladder and expandable curtain with an example tether having a triangle or inverted V shape that extends behind the expandable curtain, with the tether attached at a first location to the expandable bladder along a side of the triangle and attached at a second location that is an area at which two of the sides of the triangle join or terminate.

Referring now to FIG. 9, FIG. 9 is a partial front view of an example expandable bladder 124A and expandable curtain 122 with an example tether 700i having a triangle or V shape formation (e.g., an inverted V-shape) and that extends behind expandable curtain 122. Here, the tether 700i may be attached at a first location 701 to the expandable bladder 124A along a second side 812 of the triangle shape and attached at a second location 702, which may be a third area or point 821 at which two of the sides of the triangle join or terminate. In particular, the example tether 700i here may comprises a first side 811, a second side 812 and a third side 813. The first side 811 and second side 812 may be joined, come together or terminate at a first area or point 822. The second side 812 and third side 813 may be joined, come together or terminate at a second area or point 823. The third side 813 and the first side 811 may be joined, come together or terminate at a third area or point 821. The tether 700i in examples may be attached at the first location 701 to the expandable bladder 124A along the second side 812 of the tether 700i, e.g., along multiple points of second side 812 or along the entire second side 812. In examples, the first location 701 may be at a proximal or bottom portion of the tether 700i. The tether 700i attached at the second location 702 may comprises the tether 700i attached at the third area or point 821 to the vehicle roof 130 as illustrated in FIG. 9, or attached at the third area or point 821 to the expandable curtain 122 (not illustrated in FIG. 9) but as would be understood from the description herein. In further example of tether(s), instead of the tether(s) forming a V or inverted V shape, or having a crossing, X, or X like formation, or having parallel tethers as described herein, the tether or multiple tethers may form any suitable shape that allows the tether(s) to extend behind the expandable curtain to create a frictional coupling as described herein. In various examples, such formations may comprise one or more H or H like formation(s) in which, for example, two tethers may run generally parallel to each other (e.g., extend generally vertically downwardly in a deployed state) and another tether may connect or be attached to the two parallel tethers to form an H shape (e.g., another tether may extend generally horizontal to the two parallel tethers). In examples, there may be multiple H-shapes formed by such tethers. In other examples, such formations may comprise a Y or Y like formation(s) in which two tethers or tether portions join together at an area or point to form a V shape, while another tether or tether portion extends from the area or point at which the two tethers or tether portions form the V thereby forming the Y shape. In each of these examples, the tethers or tether may attach at a first location and attach at a second location such that the tether(s) extend behind the expandable curtain to create a frictional coupling as described herein. It should be appreciated that in examples where only a single tether is utilized, the single tether may be wider than the examples where the tether comprises multiple tethers so as to provide greater strength, stability and/or surface area for the frictional engagement or coupling.

Figure 10:
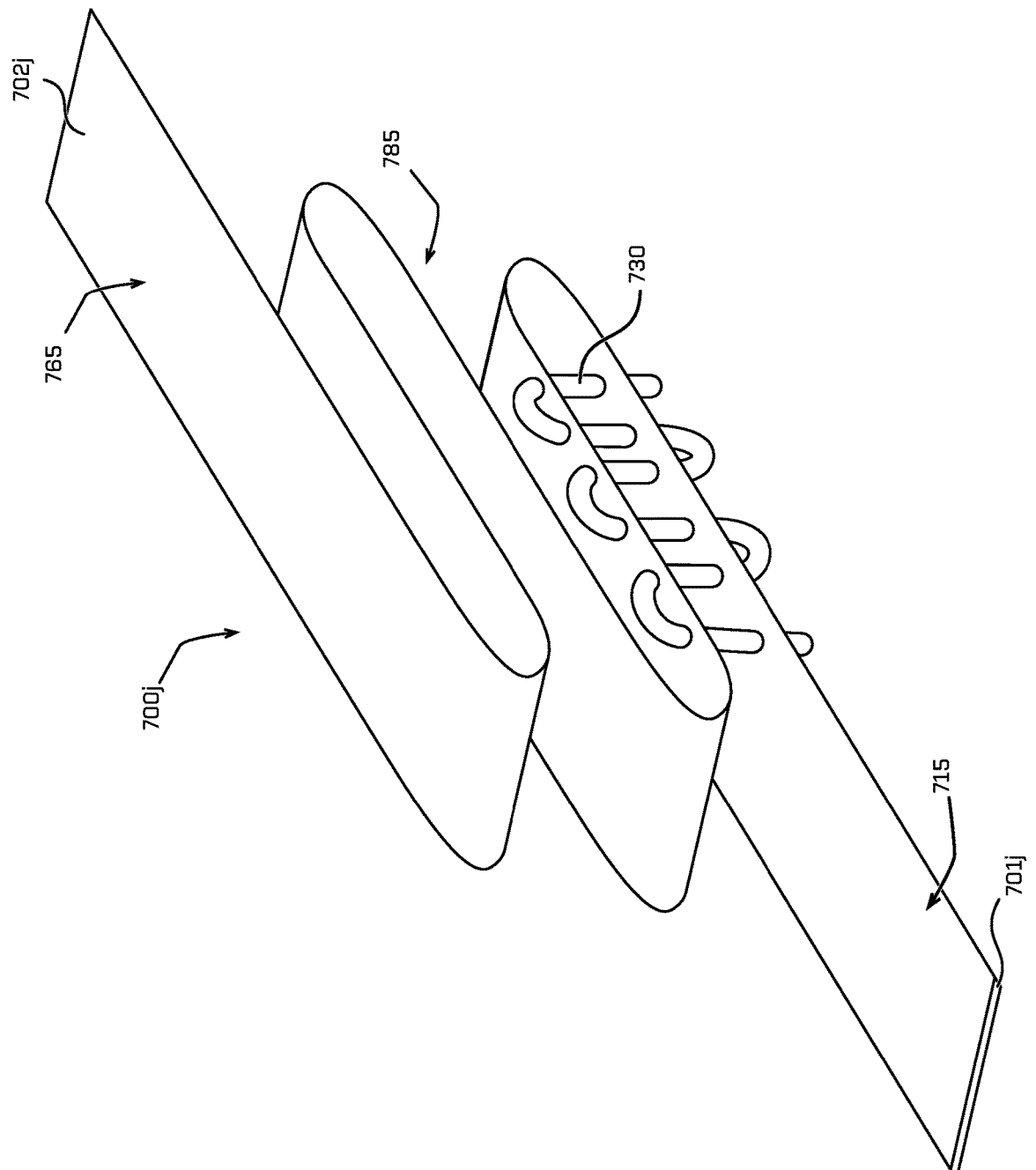
FIG. 10 is a perspective view of an example adjustable length tether for an occupant protection system in which the tether may be attached at a first location to an expandable bladder and attached at a second location to a vehicle roof or an expandable curtain.

Turning now to the example of FIG. 10, FIG. 10 is a perspective view of an example adjustable length tether 700j for an occupant protection system 120 in which the tether 700j may be attached at a first location 701j to an expandable bladder 124A and attached at a second location 702j to a vehicle roof or an expandable curtain 122 as discussed herein. The tether 700j in these examples comprises a releasable connection 730, e.g., tear stitching, which may connect different portions of the tether 700j together. The releasable connection 730 in examples may be configured so that during deployment of the expandable bladder and/or curtain, a length of tether 700j may increase to accommodate different volumes to which the bladder and/or curtain expand during deployment or in a deployed state. For example, when a temperature is relatively cold during deployment, the bladder and/or curtain may expand to a volume that is less than a volume the bladder and/or curtain may expand when the temperate is relatively warm or warmer. In such situations, the releasable connection 730 may be configured so as not to release (e.g., the tear stitching may not tear) because the tension on tether 700j during deployment or in the deployed state may not create a force sufficient to release the connection 730 (e.g., to cause the tear stitching to tear). On the other hand, when the temperature is relatively warm during deployment, the bladder and/or curtain may expand to a volume that is more than a volume the bladder and/or curtain may expand when the temperate is relatively cold or colder. In such situations, the connection 730 may release (e.g., the tear stitching may tear), due to the tension on tether 700j during deployment or in the deployed state creating a force sufficient to release the connection 730 (e.g., to cause the tear stitching to tear). In these examples, the tether 700j may comprise a first end or distal portion 765 and a second opposite, end or distal portion 775, and a middle portion 785 positioned between the first and second portions 765, 775. As illustrated, the middle portion 785 may comprise additional length for the tether during deployment, e.g., one or more folds or zig zags, and the releasable connection 730 may connect one portion of tether 700j to the middle portion 785, e.g., connect the distal end portion 775 to one or more folds of the middle portion 785. In examples, the releasable connection 785 may be any suitable connection that enables the tether 700j to adjust in length during deployment based upon an amount of tension on the tether 700j, e.g., depending upon an amount of tension created by a variable expansion volume of the curtain and/or bladder during deployment.

Figure 11:
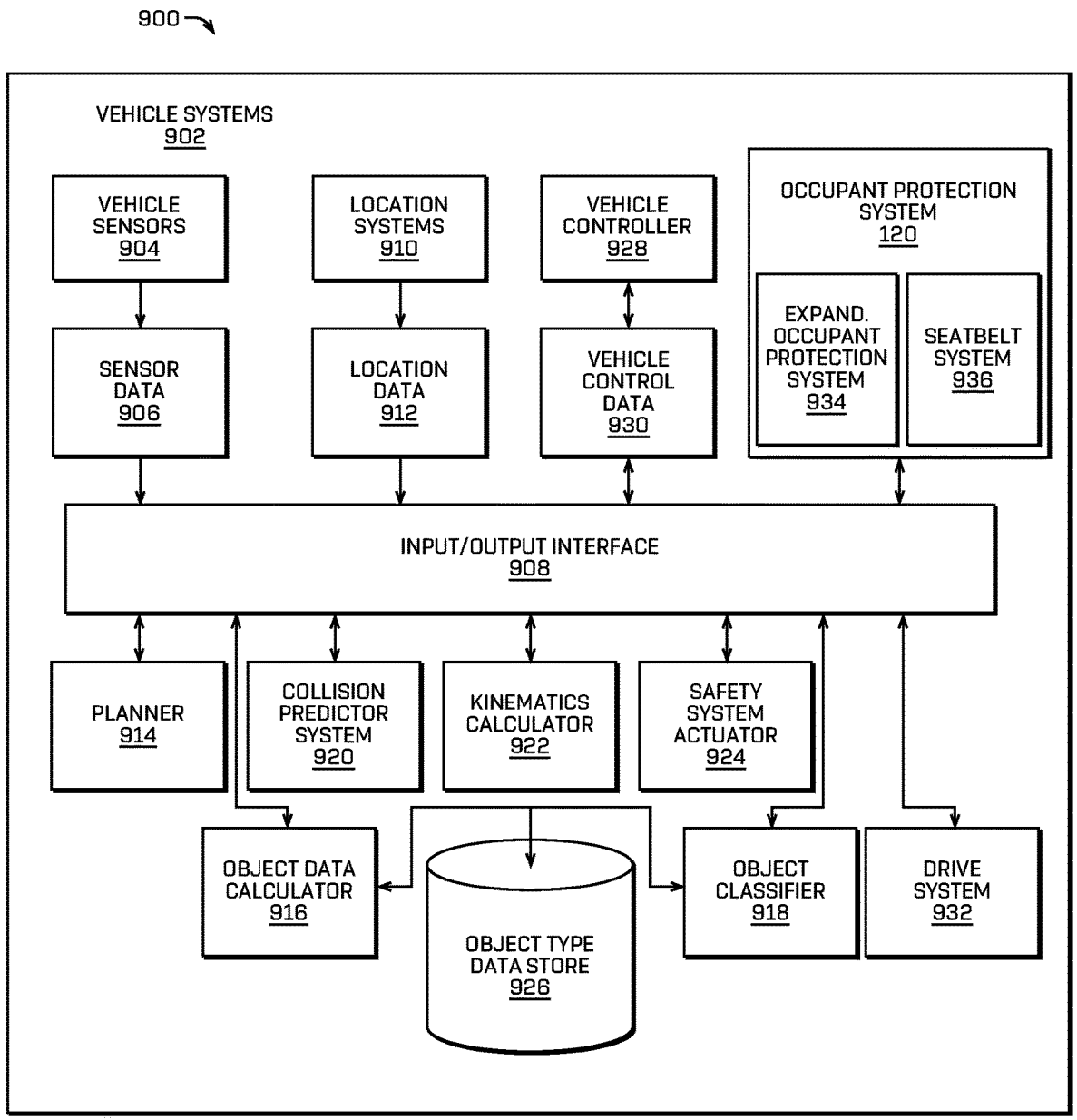
FIG. 11 is a block diagram showing an example architecture for vehicle systems including an example occupant protection system.

FIG. 11 is a block diagram of an example architecture 900 including vehicle systems 902 for controlling operation of the systems that provide data associated with operation of the vehicle 102, and that control operation of the vehicle 102. In various implementations, the architecture 900 may be implemented using a uniprocessor system including one processor, or a multiprocessor system including several processors (e.g., two, four, eight, or another suitable number). The processor(s) may be any suitable processor capable of executing instructions. For example, in various implementations, the processor(s) may be general-purpose or embedded processors implementing any of a variety of instruction set architectures (ISAs), such as the x86, PowerPC, SPARC, or MIPS ISAs, or any other suitable ISA. In multiprocessor systems, each processor may commonly, but not necessarily, implement the same ISA. In some examples, the processor(s) may include a central processing unit (CPU), a graphics processing unit (GPU), or a combination thereof.

The example architecture 900 may include a non-transitory computer readable media configured to store executable instructions/modules, data, and/or data items accessible by the processor(s). In various implementations, the non-transitory computer readable media may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, and/or data may be received, sent, or stored on different types of computer-accessible media, such as non-transitory media, or on similar media separate from the non-transitory computer readable media. Generally speaking, a non-transitory, computer readable memory may include storage media or memory media, such as flash memory (e.g., solid state memory), magnetic or optical media (e.g., a disk) coupled to the architecture 900 via an I/O interface. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via a network interface.

In some implementations, the I/O interface may be configured to coordinate I/O traffic between the processor(s), the non-transitory computer readable media, and any peripheral devices, the network interface, or other peripheral interfaces, such as input/output devices. In some implementations, the I/O interface may perform any necessary protocol, timing, or other data transformations to convert data signals from one component (e.g., the non-transitory computer readable media) into a format suitable for use by another component (e.g., processor(s)). In some implementations, the I/O interface may include support for devices attached through various types of peripheral buses, such as a variant of the Peripheral Component Interconnect (PCI) bus standard or the Universal Serial Bus (USB) standard, for example. In some implementations, the function of the I/O interface may be split into two or more separate components, such as a north bridge and a south bridge, for example. Also, in some implementations, some or all of the functionality of the I/O interface, such as an interface to the non-transitory computer readable media, may be incorporated directly into the processor(s).

In the example architecture 900 shown in FIG. 11, the example vehicle systems 902 include a plurality of vehicle sensors 904, for example, configured to sense movement of the vehicle 102 through the environment, sense environmental data, such as the ambient temperature, pressure, and humidity, and/or sense objects in the environment surrounding the vehicle 102. In some examples, the vehicle sensors 904 may include sensors configured to identify a location on a map. The vehicle sensors 904 may include, for example, one or more light detection and ranging sensors (LIDAR), one or more cameras, one or more radio detection and ranging sensors (RADAR), one or more ultrasonic transducers, one or more microphones for sensing sounds in the environment, such as sirens from law enforcement and emergency vehicles, and other sensors related to the operation of the vehicle 102. Other sensors may include a speed sensor, sensors related to operation of internal combustion engines and/or electric motors, sensors related to the tires to detect tire temperature, tire pressure, and tread depth, and/or brake-related sensors for detecting brake temperatures and/or wear, and in vehicles having regenerative braking, sensors for detecting parameters related to operation of the regenerative braking system. The vehicle sensors 904 may also include, for example, inertial measurement units (IMUs), accelerometers, and gyroscopes. The vehicle sensors 904 may be configured to provide sensor data 906 representative of the sensed objects and signals to the vehicle systems 902 via, for example, an input/output (I/O) interface 908. Other types of sensors and sensor data are contemplated.

The example vehicle systems 902 also include location systems 910 configured to receive location information, including position and orientation data (e.g., a local position or local pose) from the vehicle sensors 904 and/or external sources, and provide location data 912 to other portions of the vehicle systems 902 via the I/O interface 908. The external sources may include global satellites for facilitating operation of a global positioning system (GPS) and/or a wireless network for communicating and receiving information related to the vehicle's location, such as map data. The location systems 910 may also include sensors configured to assist with navigation of the vehicle 102, such as wheel encoders for sensing the rotation of the wheels, inertial navigation sensors, such as gyroscopes and/or accelerometers, and/or cameras, LIDAR, RADAR, etc. for obtaining image data for dead-reckoning navigation and/or SLAM-based approaches to localization.

The example vehicle systems 902 may also include one or more of a planner 914, an object data calculator 916, an object classifier 918, a collision predictor system 920, a kinematics calculator 922, and a safety system actuator 924. The vehicle systems 902 may be configured to access one or more data stores including, but not limited to, an object type data store 926. The object type data store 926 may include data representing object types associated with object classifications for objects detected in the environment.

The example vehicle systems 902 shown in FIG. 11 also include a vehicle controller 928 configured to receive vehicle control data 930, and based on the vehicle control data 930, communicate with a drive system 932 (e.g., a steering system, a propulsion system, suspension system, and/or a braking system) to control operation of the vehicle 102. For example, the vehicle control data 930 may be derived from data received from one of more of the vehicle sensors 904 and one or more of the planner 914, the object data calculator 916, the object classifier 918, the collision predictor system 920, the kinematics calculator 922, and the safety system actuator 924, and control operation of the drive system 932, so that operation and maneuvering of the vehicle 102 is executed.

In some examples, the planner 914 may be configured to generate data representative of a trajectory of the vehicle 102, for example, using data representing a location of the vehicle 102 in the environment and other data, such as local pose data, that may be included in the location data 912. In some examples, the planner 914 may also be configured to determine projected trajectories predicted to be executed by the vehicle 102. The planner 914 may, in some examples, be configured to calculate data associated with a predicted motion of an object in the environment, and may determine a predicted object path associated with the predicted motion of the object. In some examples, the object path may include the predicted object path. In some examples, the object path may include a predicted object trajectory. In some examples, the planner 914 may be configured to predict more than a single predicted object trajectory. For example, the planner 914 may be configured to predict multiple object trajectories based on, for example, probabilistic determinations or multi-modal distributions of predicted positions, trajectories, and/or velocities associated with an object.

In some examples, the object data calculator 916 may be configured to provide data representative of, for example, one or more of the location of an object in the environment surrounding the vehicle 102, an object track associated with the object, and an object classification associated with the object. For example, the object data calculator 916 may be configured to receive data in the form of sensor signals received from one or more of the vehicle sensors 904 and determine data representing one or more of the location in the environment of the object, the object track, and the object classification.

In some examples, the object classifier 918 may be configured to access data from the object type data store 926, which may be configured to store data representing object types, such as, for example, a species of an object classification, a subclass of an object classification, and/or a subset of an object classification. The object classifier 918, in some examples, may be configured to analyze data representing an object track and data representing an object classification with data representing an object type, and determine an object type based at least in part on the object track and classification data. For example, a detected object having an object classification of an "automobile" may have an object type of "sedan," "coupe," "hatch-back," "sports utility vehicle," "pick-up truck," or "minivan." An object type may include additional subclasses or subsets. For example, a "sedan" that is parked may have an additional subclass designation of being "static" or being "dynamic" if moving.

In some examples, the collision predictor system 920 may be configured to use the data representing the object type, the data representing the trajectory of the object, and/or the data representing the trajectory of the vehicle 102, to predict a collision between the vehicle 102 and the object.

In some examples, the kinematics calculator 922 may be configured to determine data representing one or more scalar and/or vector quantities associated with motion of objects in the environment, including, but not limited to, velocity, speed, acceleration, deceleration, momentum, local pose, and/or force. Data from the kinematics calculator 922 may be used to compute other data, including, but not limited to, data representing an estimated time to impact between an object and the vehicle 102, and data representing a distance between the object and the vehicle 102. In some examples, the kinematics calculator 922 may be configured to predict a likelihood that other objects in the environment (e.g., cars, motorcyclists, pedestrians, cyclists, and animals) are moving in an alert or controlled state, versus an un-alert or uncontrolled state. For example, the kinematics calculator 922 may be configured estimate the probability that other objects are moving as though they are being controlled and/or are behaving in a predictable manner, or whether they are not being controlled and/or behaving in an unpredictable manner, for example, by observing motion of the object over time and relative to other objects in the environment. For example, if the objects are moving erratically or without appearing to adjust to the presence or motion of other objects in the environment, this may be an indication that the objects are either uncontrolled or moving in an unpredictable manner. This may be inferred based on sensor data received over time that may be used to estimate or predict a future location of the object relative to a current or future trajectory of the vehicle 102.

In some examples, the safety system actuator 924 may be configured to activate one or more safety systems of the autonomous vehicle 102 when a collision is predicted by the collision predictor 920 and/or the occurrence of other safety related events, such as, for example, an emergency maneuver by the vehicle 102, such as hard braking or a sharp acceleration. The safety system actuator 924 may be configured to activate an interior safety system (e.g., including sending one or more signals to the deployment control system 126 of the occupant protection system 120), an exterior safety system (e.g., including warning sounds and/or warning lights), the drive system 932, which may be configured to execute an emergency maneuver to avoid a collision, and/or any combination thereof. For example, the drive system 932 may receive data for causing a steering system of the vehicle 102 to change the travel direction of the vehicle 102, and a propulsion system of the vehicle 102 to change the speed of the vehicle 102 to alter the trajectory of vehicle 102 from an initial trajectory to a trajectory for avoiding a collision.

Some examples of the vehicle systems 902 may operate according to the following example. Data representing a trajectory of the vehicle 102 in the environment may be received by the vehicle controller 928. Object data associated with an object in the environment may be calculated. Sensor data 906 from one or more of the vehicle sensors 904 may be used to calculate the object data. The object data may include data representing the location of the object in the environment, an object track associated with the object, such as whether the object is stationary or moving, and an object classification associated with the object, such as whether the object is another vehicle, a pedestrian, a cyclist, an animal, or a stationary object. In some examples, the object data calculator 916, based on the object data, may be used to determine data representing the object's location in the environment, data representing whether the object is moving, and data representing a classification associated with the object.

In some examples, the planner 914 may use the object data to determine a predicted path of the object in the environment, for example, based on data representing the location of the object and may process that data to generate data representing a predicted object path. Data representing the type of object may be determined based on the data representing whether the object is moving, data representing the object's classification, and/or data representing object's type. A pedestrian not in motion, a vehicle in motion, and traffic sign, a lane marker, or a fire hydrant, none of which is in motion, are examples of object types with an associated motion data.

In some examples, the collision predictor system 920 may be used to predict a collision between the vehicle 102 and an object in the environment based on the object type, whether the object is moving, the trajectory of the vehicle 102, the predicted path of the object obtained from the planner 914. For example, a collision may be predicted based in part on the object type due to the object moving, the trajectory of the object being in potential conflict with the trajectory of the vehicle 102, and the object having an object classification that indicates the object is a likely collision threat.

In some examples, the safety system actuator 924 may be configured to actuate one or more portions of a safety system of the vehicle 102 when a collision is predicted. For example, the safety system actuator 924 may activate one or more safety systems of the vehicle 102, such as, for example, one or more of the interior safety systems, one or more of the exterior safety systems, and one or more of the components of the drive system 932 (e.g., the steering system, the propulsion system, and/or the braking system) via the vehicle controller 928. In some examples, the vehicle controller 928 may determine that the interior safety system will be activated based on some action of an object in the environment, and the vehicle control data 930 may include information configured to cause the vehicle controller 928 to activate one or more functions of the interior safety system, the exterior safety system, and the drive system 932.

As shown in FIG. 11, the example vehicle systems 902 also include the occupant protection system 120, which may operate as described herein. In some examples, the occupant protection system 120 may include an expandable occupant protection system 934 and a seatbelt system 936, which may be in communication with other vehicle systems 902 via the input/output interface 908. For example, the occupant protection system 120 may be in communication with the safety system actuator 924, and the deployment control system 126 may receive one or more signals from the vehicle systems 902 and activate the portions of the expandable occupant protection system 934, for example, as described herein.

Figure 12:
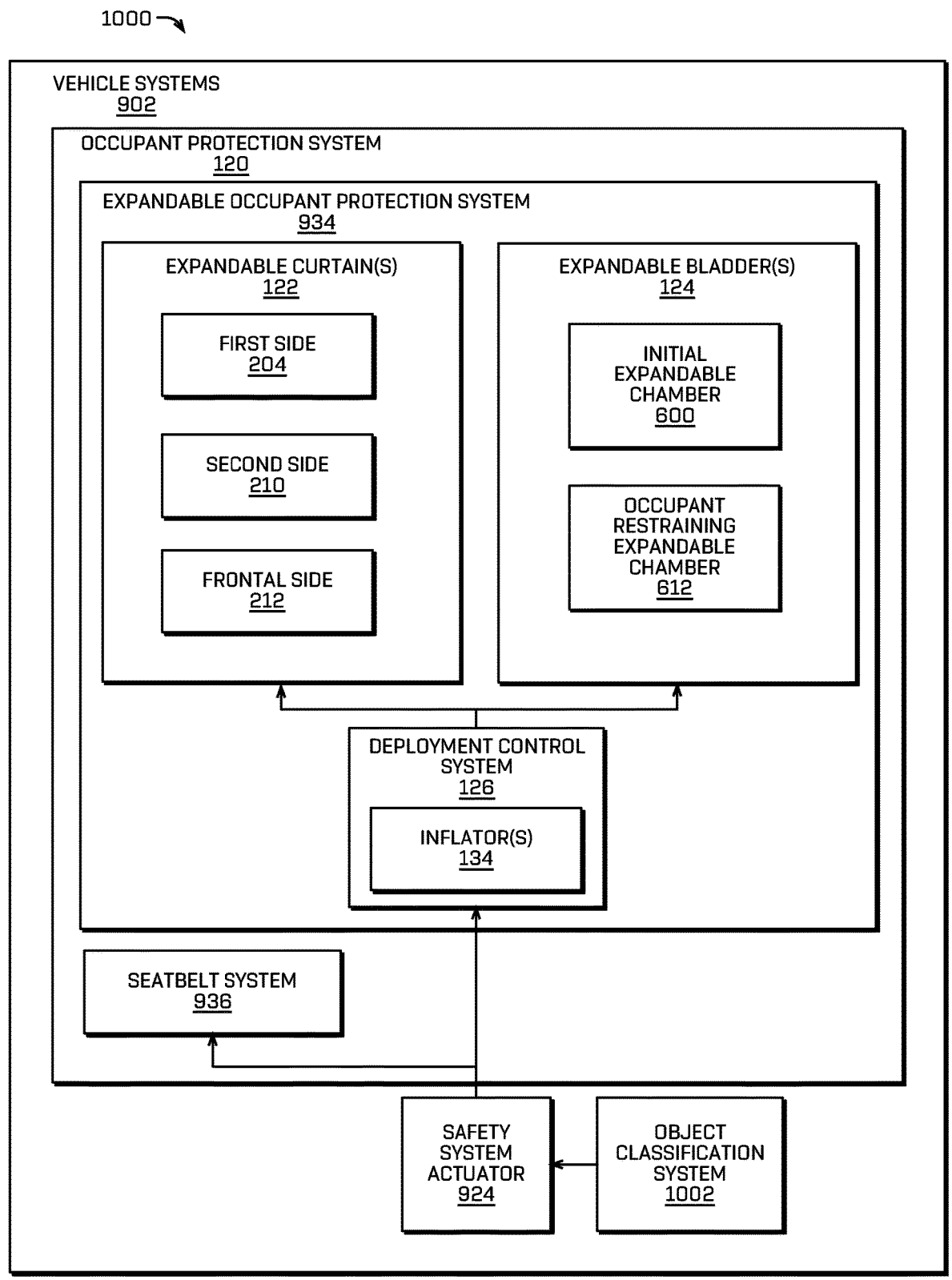
FIG. 12 is a block diagram including an example architecture for an occupant protection system.

FIG. 12 shows an example architecture 1000 including the vehicle systems 902 and the example occupant protection system 120. In the example shown, the example occupant protection system 120 includes an expandable occupant protection system 934 and a seatbelt system 936, which controls operation of systems related to the seatbelts in the vehicle 102. In the example shown, the expandable occupant protection system 934 includes one or more expandable curtains 122 and one or more expandable bladders 124, for example, expandable bladder 124A, 124B, as described herein. The expandable curtain(s) 122 may include one or more of a first side 204, a second side 210, and a transverse portion 212 extending between the first side 204 and second side 210 and, in some examples, coupling the first and second sides 204 and 210 to one another. The expandable bladder(s) 124 may include one or more of a first initial expandable chamber 600 and a second occupant restraining expandable chamber 612, as described herein.

In the example architecture 1000 shown in FIG. 12, the occupant protection system 120 also includes a deployment control system 126, which may include one or more inflators 134 configured to supply fluid and/or gas to the expandable curtain(s) 122 and/or the expandable bladder(s) 124, for example, when activated by the deployment control system 126, as described herein.

In some examples, the deployment control system 126 may be configured to receive a signal indicative of a predicted collision involving the vehicle 102 and/or a collision involving the vehicle 102, and cause deployment of one or more expandable curtains 122, and/or one or more expandable bladders 124 based at least in part on the signal(s). For example, the vehicle sensors 904 may provide information to the collision predictor system 920, which may predict a collision with an object in the environment through which the vehicle 102 is travelling. The collision predictor system 920 may provide information to the safety actuator system 924, which in turn, provides one or more signals to the deployment control system 126, which may activate one more inflators 134 to cause deployment of one or more expandable curtains 122 and/or one or more expandable bladders 124.

In some examples, the deployment control system 126 may be configured to receive one or more signals indicative of the presence of an occupant 104 in a first location of the vehicle 102 associated with (e.g., within an effective range of) one of the expandable bladders 124, and cause deployment of the corresponding expandable bladder 124 associated with the position of the occupant 104 based at least in part on the one or more signals. For example, the vehicle systems 902 may include an object classification system 1002 configured to determine information related, for example, to whether an object and/or occupant 104 is present in one or more of the respective seats 106 of the vehicle 102. In some examples, the object classification system 1002 may leverage one or more of the vehicle sensors 904 and determine information about the object and/or occupant 104, such as, for example, the size and/or weight of the object and/or occupant 104 (e.g., whether the occupant 104 is an adult, a child, or an infant). As a non-limiting example, image systems (e.g., cameras) internal to the vehicle 102 may determine presence of an occupant 104 in a seat 106. If no occupant 104 is present, the deployment control system 126 may receive one or more signals associated with whether an occupant 104 is in the seat 106, for example, via the safety system actuator 924, and based at least in part on the one or more signals, determine whether to initiate deployment of, before or during a collision, the expandable curtain 122 and/or the expandable bladder 124 associated with (e.g., within an effective range of) the seat 106. For example, if an occupant 104 is not present in the seat 106, the deployment control system 126 may not initiate deployment of the expandable curtain 122 or the expandable bladder 124. This may prevent unnecessary deployment and prevent costs associated with servicing deployed parts of the occupant protection system 120. Alternatively, if an occupant 104 is present in the seat 106, the deployment control system 126 may initiate deployment of the expandable curtain 122 and/or the expandable bladder 124 associated with (e.g., within an effective range of) the position of the occupant 104 to protect the occupant 104 during the collision.

In some examples, the deployment control system 126 may be configured to receive one or more signals indicative of whether the occupant 104 is properly wearing a seatbelt, and cause and/or control deployment of the expandable curtain 122 and/or the expandable bladder 124 associated with the position of the occupant 104 based at least in part on the one or more signals indicative of whether the occupant 104 is properly wearing the seatbelt. For example, the vehicle sensors 904 and/or vehicle systems 902 may determine whether the occupant 104 is properly wearing a seatbelt. The deployment control system 126 may receive one or more such signals and, based at least in part on the signals, initiate and/or control deployment of the expandable curtain 122 and/or the expandable bladder 124 before or during a collision involving the vehicle 102.

For example, if the occupant 104 is wearing a seatbelt, the deployment control system 126 may reduce the deployment rate and/or the deployment volume (or pressure) of the expandable curtain 122 and/or expandable bladder 124, for example, since the seatbelt will be expected to assist with preventing injury to the occupant 104 during the collision. If, on the other hand, the occupant 104 is not properly wearing a seatbelt, the deployment control system 126 may maintain or increase the deployment rate and/or the deployment volume (or pressure) of the expandable curtain 122 and/or expandable bladder 124, for example, since the seatbelt will not be expected to assist with preventing injury to the occupant 104 during the collision.

In some examples, deployment of the expandable curtain 122 and/or one or more of the expandable bladders 124 may be affected by a number of parameters. For example, the deployment rate, the deployment volume (or pressure), the timing of deployment, and/or the sequence of deployment of one or more of the expandable curtain 122 or the expandable bladders 124 may be altered based at least in part on one or more parameters, such as, for example, the severity of a collision impact, whether one or more occupants 104 is/are properly wearing a seatbelt, and/or the size and/or weight of the occupant(s) 104 (e.g., depending on whether the occupant is an adult, a child, or an infant).

In some examples, the expandable curtain 122 and one or more of the expandable bladders 124 may be deployed independently from one another. For example, the expandable curtain 122 may be deployed without deploying any of the expandable bladders 124. For example, if objects are detected in the interior 100 of the vehicle 102 and a rapid change in the speed and/or direction of travel of the vehicle 102 occurs, the expandable curtain 122 alone may be deployed to prevent objects in the vehicle 102 from being tossed around inside the vehicle 102 during the rapid change in speed and/or direction. This may be particularly useful when, for example, an occupant 104 is in a seat 106 facing a seat 106 on which one or more objects have been placed. Upon the rapid change of speed and/or direction, the expandable curtain 122 may be deployed in order to prevent the one or more objects from being thrown from the seat 106 opposite the occupant 104 into the occupant 104.

The deployment control system 126, in some examples, may be configured to receive one or more signals indicative of a direction of travel of the vehicle 102, and cause deployment of the expandable curtain 122 and/or the expandable bladder 124 based at least in part on the one or more signals indicative of the direction of travel of the vehicle 102. For example, the vehicle 102 may be a bi-directional vehicle configured to travel between locations with either end of the vehicle 102 being the leading end, for example, as described herein with respect to FIG. 1. In such vehicles, a seat 106 may be facing the direction of travel when the vehicle 102 is traveling with one end of the vehicle being the leading end, but with the seat 106 facing rearward with the other end of the vehicle 102 being the leading end. The vehicle 102 may include sensors and/or a system configured to generate one or more signals indicative of whether the vehicle 102 is traveling in a direction such that the seat 106 is facing forward (i.e., along a direction of travel) or the seat 106 is facing rearward (i.e., opposing a direction of travel). The deployment control system 126 may be configured to prevent deployment of the expandable curtain 122 and/or the expandable bladder 124 associated with the seat 106, even when occupied, for example, when the seat 106 is facing rearward based at least in part on the signals. This may prevent unnecessary deployment and costs associated with servicing deployed parts of the occupant protection system 120. Alternatively, if the seat 106 is facing forward, the deployment control system 126 may initiate deployment of the expandable curtain 122 and/or the expandable bladder 124 associated with the position of the seat 106 to protect the occupant 104 during the collision, for example, as described herein.

In various implementations, the parameter values and other data illustrated herein may be included in one or more data stores, and may be combined with other information not described or may be partitioned differently into more, fewer, or different data structures. In some implementations, data stores may be physically located in one memory or may be distributed among two or more memories.

Those skilled in the art will appreciate that the example architectures 900 and 1000 are merely illustrative and are not intended to limit the scope of the present disclosure. In particular, the computing system and devices may include any combination of hardware or software that can perform the indicated functions, including computers, network devices, internet appliances, tablet computers, PDAs, wireless phones, pagers, etc. The architectures 900 and 1000 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated architectures 900 and 1000. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the architectures 900 and 1000 may be transmitted to the architectures 900 and 1000 via transmission media or signals such as electrical, electromagnetic, or digital signals, conveyed via a communication medium such as a wireless link. Various implementations may further include receiving, sending, or storing instructions and/or data implemented in accordance with the foregoing description on a computer-accessible medium. Accordingly, the techniques described herein may be practiced with other control system configurations. Additional information about the operations of the modules of the vehicle 102 is discussed below.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Based on the foregoing, it should be appreciated that technologies for deploying an occupant protection system have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

Example Clauses

A: A vehicle comprising: a vehicle floor; a vehicle roof; a first interior side; a second interior side; an occupant protection system comprising: an expandable curtain configured to be expanded from a stowed state to a deployed state having a length configured to extend at least a portion of a distance between the vehicle roof and a vehicle floor, wherein in the deployed state of the expandable curtain, the expandable curtain comprises: a first side configured to extend along a portion of the first interior side, a second side configured to extend along a portion of a second interior side opposite the first interior side; and a transverse portion extending between the first side and the second side, the transverse portion comprising a support side face and a rear side face opposite the support side face, the first side, the second side, and the transverse portion being contiguous; an expandable bladder configured to expand from a stowed state to a deployed state having a length configured to extend at least a portion of a distance between the vehicle roof and a vehicle floor, wherein in the deployed state of the expandable bladder, the expandable bladder comprises: an occupant facing surface, and a rear surface opposite the occupant facing surface, in the deployed state of the expandable bladder, the rear surface configured to face the support side face of the transverse portion of the expandable curtain; and a tether attached at a first location to the expandable bladder and attached at a second location such that in the deployed state of the expandable curtain and the expandable bladder, the tether extends behind the rear side face of the transverse portion of the expandable curtain and frictionally engages the rear side face of the transverse portion of the expandable curtain, thereby creating a resistance to lateral movement of the expandable bladder in a direction from the first interior side of the vehicle to the second interior side of the vehicle.

B: The vehicle as paragraph A describes, wherein the tether comprises: a first tether attached to the expandable bladder, a second tether attached to the expandable bladder and the attachment at the second location comprises each of the first and second tethers attached such that in the deployed state of the expandable curtain and the expandable bladder each of the first and second tethers extend behind the rear side face of the transverse portion of the expandable curtain and frictionally engage the rear side face of the transverse portion of the expandable curtain, thereby creating a resistance to movement of the expandable bladder in a direction from the first interior side of the vehicle to the second interior side of the vehicle C: The vehicle as paragraph B describes, wherein one of: (i) in the deployed state of the expandable curtain, the first tether and the second tether cross one another behind the rear side face of the transverse portion of the expandable curtain, or (ii) in the deployed state of the expandable curtain, the first tether and the second tether extend substantially parallel to one another behind the rear side face of the transverse portion of the expandable curtain.

D: The vehicle as paragraph A describes, wherein the stowed state of the expandable curtain comprises: a first portion of the expandable curtain stowed in a first formation, a second portion of the expandable curtain stowed in a second formation different from the first formation, the first formation less resistant to expansion than the second formation.

E: The vehicle as paragraph D describes, wherein: the first formation comprises a zig-zag formation, and the second formation comprises a coil formation.

F: The vehicle as paragraph D describes, wherein the tether attached at the second location comprises the tether attached to the expandable curtain above the second formation.

G. The vehicle as paragraph A describes, wherein the tether comprises an adjustable length tether configured to increase in length when the expandable curtain and the expandable bladder expand from the respective stowed and deployed states.

H. A vehicle occupant protection system comprising: an expandable curtain configured to be expanded from a stowed state to a deployed state having a length configured to extend at least a portion of a distance between a roof of a vehicle and a floor of the vehicle, wherein in the deployed state of the expandable curtain, the expandable curtain comprises a transverse portion having a support side face and a rear side face opposite the support side face; an expandable bladder configured to expand from a stowed state to a deployed state having a length configured to extend at least a portion of a distance between the roof of the vehicle and the floor of the vehicle, wherein in the deployed state of the expandable bladder, the expandable bladder comprises an occupant facing surface and a rear surface opposite the occupant facing surface, the rear surface configured to face the support side face of the transverse portion of the expandable curtain; and a tether attached at a first location to the expandable bladder and attached at a second location such that in the deployed state of the expandable curtain and the expandable bladder, the tether extends behind the rear side face of the transverse portion of the expandable curtain and frictionally engages the rear side face of the transverse portion of the expandable curtain, thereby creating a resistance to lateral movement of the expandable bladder.

I: The vehicle occupant protection system as paragraph H describes, wherein one of (i) the tether attached to the second location comprises the tether attached to the expandable curtain, or (ii) the tether attached to the second location comprises the tether configured to be attached to the roof of the vehicle.

J: The vehicle occupant protection system as paragraph H describes, wherein the tether comprises: a first tether attached to the expandable bladder, a second tether attached to the expandable bladder, and the attachment at the second location comprises each of the first and second tethers attached to the expandable curtain such that in the deployed state of the expandable curtain and the expandable bladder each of the first and second tethers extend behind the rear side face of the transverse portion of the expandable curtain and frictionally engage the rear side face of the transverse portion of the expandable curtain, thereby creating a resistance lateral movement of the expandable bladder.

K: The vehicle occupant protection system as paragraph J describes, wherein one of: (i) in the deployed state of the expandable curtain, the first tether and the second tether cross one another behind the rear side face of the transverse portion of the expandable curtain, or (ii) in the deployed state of the expandable curtain, the first tether and the second tether extend substantially vertically and parallel to one another behind the rear side face of the transverse portion of the expandable curtain.

L: The vehicle occupant protection system as paragraph H describes, wherein the expandable curtain in the deployed state comprises: a first side configured to extend along a portion of a first interior side of the vehicle; a second side configured to extend along a portion of a second interior side of the vehicle opposite the first interior side; and wherein (i) the transverse portion of the expandable curtain extends between the first side and the second side, and (ii) the first side, the second side and the transverse portion are contiguous.

M: The vehicle occupant protection system as paragraph H describes, wherein the stowed state of the expandable curtain comprises the expandable curtain stowed in a coil formation.

N: The vehicle occupant protection system as paragraph H describes, wherein the stowed state of the expandable curtain comprises: a first portion of the expandable curtain stowed in a first formation, a second portion of the expandable curtain stowed in a second formation different from the first formation, the first formation less resistant to expansion than the second formation.

O: The vehicle occupant protection system as paragraph N describes, wherein: the first formation comprises a zig-zag formation, and the second formation comprises a coil formation.

P: The vehicle occupant protection system as paragraph N describes, wherein the tether attached at the second location comprises the tether attached above the second formation.

Q: The vehicle occupant protection system as paragraph H describes, wherein: (i) the tether comprises a triangular shape having a first side, a second side and a third side, the first side and second side joined at a first area, the second side and the third side joined at a second area, and the third side and first side joined at a third area; and (ii) the tether attached at the second location comprises the tether (a) attached to the expandable curtain at the third area, or (b) configured to be attached to the roof of the vehicle at the third area.

R: The vehicle occupant protection system as paragraph Q describes, wherein the tether attached at the first location comprises the expandable bladder attached to the tether along the second side of the tether.

S: The vehicle occupant protection system as paragraph H describes, wherein the tether comprises an adjustable length tether configured to increase a length of the tether that frictionally engages the expandable curtain when the expandable curtain and the expandable bladder expands from the respective stowed and deployed states.

T: The vehicle occupant protection system as paragraph S describes, wherein the adjustable length tether comprises tearable stitching configured to tear and increase the length of the tether that frictionally engages the expandable curtain when the expandable curtain expands from the stowed state to the deployed state.

What is claimed is:

1. A vehicle comprising:
a vehicle floor;
a vehicle roof;
a first interior side;
a second interior side;
an occupant protection system comprising:
an expandable curtain configured to be expanded from a stowed state to a deployed state having a length configured to extend at least a portion of a distance between the vehicle roof and the vehicle floor, wherein in the deployed state of the expandable curtain, the expandable curtain comprises:
a first side configured to extend along a portion of the first interior side,
a second side configured to extend along a portion of the second interior side opposite the first interior side; and
a transverse portion extending between the first side and the second side, the transverse portion comprising a support side face and a rear side face opposite the support side face, the first side, the second side, and the transverse portion being contiguous;
an expandable bladder configured to expand from a stowed state to a deployed state having a length configured to extend at least a portion of a distance between the vehicle roof and the vehicle floor, wherein in the deployed state of the expandable bladder, the expandable bladder comprises:
an occupant facing surface, and
a rear surface opposite the occupant facing surface, in the deployed state of the expandable bladder, the rear surface configured to face the support side face of the transverse portion of the expandable curtain; and
a tether attached at a first location to the expandable bladder and attached at a second location such that in the deployed state of the expandable curtain and the expandable bladder, the tether extends behind the rear side face of the transverse portion of the expandable curtain and frictionally engages the rear side face of the transverse portion of the expandable curtain, thereby creating a resistance to lateral movement of the expandable bladder in a direction from the first interior side of the vehicle to the second interior side of the vehicle.

2. The vehicle of claim 1, wherein the tether comprises:
a first tether attached to the expandable bladder,
a second tether attached to the expandable bladder and
the attachment at the second location comprises each of the first and second tethers attached such that in the deployed state of the expandable curtain and the expandable bladder each of the first and second tethers extend behind the rear side face of the transverse portion of the expandable curtain and frictionally engage the rear side face of the transverse portion of the expandable curtain, thereby creating a resistance to movement of the expandable bladder in a direction from the first interior side of the vehicle to the second interior side of the vehicle.

3. The vehicle of claim 2, wherein one of:
(i) in the deployed state of the expandable curtain, the first tether and the second tether cross one another behind the rear side face of the transverse portion of the expandable curtain, or
(ii) in the deployed state of the expandable curtain, the first tether and the second tether extend substantially parallel to one another behind the rear side face of the transverse portion of the expandable curtain.

4. The vehicle of claim 1, wherein the stowed state of the expandable curtain comprises:
a first portion of the expandable curtain stowed in a first formation,
a second portion of the expandable curtain stowed in a second formation different from the first formation, the first formation less resistant to expansion than the second formation.

5. The vehicle of claim 4, wherein:
the first formation comprises a zig-zag formation, and
the second formation comprises a coil formation.

6. The vehicle of claim 4, wherein the tether attached at the second location comprises the tether attached to the expandable curtain above the second formation.

7. The vehicle of claim 1, wherein the tether comprises an adjustable length tether configured to increase in length when the expandable curtain and the expandable bladder expand from the respective stowed and deployed states.

8. A vehicle occupant protection system comprising:
an expandable curtain configured to be expanded from a stowed state to a deployed state having a length configured to extend at least a portion of a distance between a roof of a vehicle and a floor of the vehicle, wherein in the deployed state of the expandable curtain, the expandable curtain comprises a transverse portion having a support side face and a rear side face opposite the support side face;
an expandable bladder configured to expand from a stowed state to a deployed state having a length configured to extend at least a portion of a distance between the roof of the vehicle and the floor of the vehicle, wherein in the deployed state of the expandable bladder, the expandable bladder comprises an occupant facing surface and a rear surface opposite the occupant facing surface, the rear surface configured to face the support side face of the transverse portion of the expandable curtain; and
a tether attached at a first location to the expandable bladder and attached at a second location such that in the deployed state of the expandable curtain and the expandable bladder, the tether extends behind the rear side face of the transverse portion of the expandable curtain and frictionally engages the rear side face of the transverse portion of the expandable curtain, thereby creating a resistance to lateral movement of the expandable bladder.

9. The vehicle occupant protection system of claim 8, wherein one of (i) the tether attached to the second location comprises the tether attached to the expandable curtain, or (ii) the tether attached to the second location comprises the tether configured to be attached to the roof of the vehicle.

10. The vehicle occupant protection system of claim 8, wherein the tether comprises:
a first tether attached to the expandable bladder,
a second tether attached to the expandable bladder, and
the attachment at the second location comprises each of the first and second tethers attached to the expandable curtain such that in the deployed state of the expandable curtain and the expandable bladder each of the first and second tethers extend behind the rear side face of the transverse portion of the expandable curtain and frictionally engage the rear side face of the transverse portion of the expandable curtain, thereby creating a resistance to lateral movement of the expandable bladder.

11. The vehicle occupant protection system of claim 10, wherein one of:
(i) in the deployed state of the expandable curtain, the first tether and the second tether cross one another behind the rear side face of the transverse portion of the expandable curtain, or
(ii) in the deployed state of the expandable curtain, the first tether and the second tether extend substantially vertically and parallel to one another behind the rear side face of the transverse portion of the expandable curtain.

12. The vehicle occupant protection system of claim 8, wherein the expandable curtain in the deployed state comprises:
a first side configured to extend along a portion of a first interior side of the vehicle;
a second side configured to extend along a portion of a second interior side of the vehicle opposite the first interior side; and
wherein (i) the transverse portion of the expandable curtain extends between the first side and the second side, and (ii) the first side, the second side and the transverse portion are contiguous.

13. The vehicle occupant protection system of claim 8, wherein the stowed state of the expandable curtain comprises the expandable curtain stowed in a coil formation.

14. The vehicle occupant protection system of claim 8, wherein the stowed state of the expandable curtain comprises:
a first portion of the expandable curtain stowed in a first formation,
a second portion of the expandable curtain stowed in a second formation different from the first formation, the first formation less resistant to expansion than the second formation.

15. The vehicle occupant protection system of claim 14, wherein:
the first formation comprises a zig-zag formation, and
the second formation comprises a coil formation.

16. The vehicle occupant protection system of claim 14, wherein the tether attached at the second location comprises the tether attached above the second formation.

17. The vehicle occupant protection system of claim 8, wherein:
(i) the tether comprises a triangular shape having a first side, a second side and a third side, the first side and second side joined at a first area, the second side and the third side joined at a second area, and the third side and first side joined at a third area; and
(ii) the tether attached at the second location comprises the tether (a) attached to the expandable curtain at the third area, or (b) configured to be attached to the roof of the vehicle at the third area.

18. The vehicle occupant protection system of claim 17, wherein the tether attached at the first location comprises the expandable bladder attached to the tether along the second side of the tether.

19. The vehicle occupant protection system of claim 8, wherein the tether comprises an adjustable length tether configured to increase a length of the tether that frictionally engages the expandable curtain when the expandable curtain and the expandable bladder expands from the respective stowed and deployed states.

20. The vehicle occupant protection system of claim 19, wherein the adjustable length tether comprises tearable stitching configured to tear and increase the length of the tether that frictionally engages the expandable curtain when the expandable curtain expands from the stowed state to the deployed state.

* * * * *